US007724395B2

(12) United States Patent
Yamazaki

(10) Patent No.: US 7,724,395 B2
(45) Date of Patent: May 25, 2010

(54) DOT ARRANGEMENT DETERMINATION METHOD, PROGRAM AND APPARATUS, THRESHOLD MATRIX CREATING METHOD AND PROGRAM, AND IMAGE FORMING APPARATUS

(75) Inventor: Yoshirou Yamazaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1096 days.

(21) Appl. No.: 11/237,968

(22) Filed: Sep. 29, 2005

(65) Prior Publication Data

US 2006/0072160 A1 Apr. 6, 2006

(30) Foreign Application Priority Data

Sep. 30, 2004 (JP) .............................. 2004-289162

(51) Int. Cl.
G06K 15/00 (2006.01)
H04N 1/405 (2006.01)
H04N 1/40 (2006.01)
(52) U.S. Cl. ...................... 358/3.06; 358/3.21; 358/3.24
(58) Field of Classification Search ........................ None
See application file for complete search history.

(56) References Cited

U.S. PATENT DOCUMENTS

| 6,215,557 | B1 * | 4/2001 | Owens ....................... 358/1.14 |
| 6,714,320 | B1 | 3/2004 | Nakahara et al. |
| 7,027,183 | B2 * | 4/2006 | Ohshima ..................... 358/1.9 |
| 7,085,002 | B2 * | 8/2006 | Ilbery et al. .................. 358/1.8 |

(Continued)

FOREIGN PATENT DOCUMENTS

JP 2001-88328 A 4/2001

(Continued)

OTHER PUBLICATIONS

Aich, T., et al. "Anisotropic Spectral Magnitude Estimation Filters for Noise Reduction and Image Enhancement", , Philips GmbH Research Laboratories, IEEE, pp. 335-338, 1996.*

*Primary Examiner*—Mark K Zimmerman
*Assistant Examiner*—Ming Hon
(74) *Attorney, Agent, or Firm*—Birch, Stewart, Kolasch & Birch, LLP

(57) ABSTRACT

The dot arrangement determination method for determining an arrangement pattern when m dots (where m is a natural number) are arranged in a specific pixel area, the method comprises: a setting step of variably setting an arrangement pattern in which the m dots are arranged without overlapping at pixel positions in the specific pixel area; a first image evaluation value calculating step of calculating an image evaluation value of a halftone image formed by arranging the m dots in the specific pixel area in accordance with the arrangement pattern set in the setting step; a second image evaluation value calculating step of calculating an image evaluation value of a halftone image implemented according to the arrangement pattern set in the setting step when dots cannot be formed in an arbitrary pixel row in the specific pixel area; and a dot arrangement calculating step of determining the arrangement pattern with least image quality degradation for inability to form dots in an arbitrary pixel row in the specific pixel area by approximately solving a combinational optimization problem for the arrangement pattern using calculation results of the first and second image evaluation value calculating steps.

22 Claims, 21 Drawing Sheets

U.S. PATENT DOCUMENTS

| | | | |
|---|---|---|---|
| 7,139,101 B2 * | 11/2006 | Loce et al. | 358/3.06 |
| 2002/0063873 A1 * | 5/2002 | Kakutani et al. | 358/1.8 |
| 2004/0218221 A1 * | 11/2004 | Hirano et al. | 358/3.06 |

FOREIGN PATENT DOCUMENTS

| | | |
|---|---|---|
| JP | 2002-16802 A | 1/2002 |
| JP | 2002-16803 A | 1/2002 |
| JP | 2004-15674 A | 1/2004 |
| WO | WO-03/105461 A1 | 12/2003 |

* cited by examiner

RADIALLY AVERAGE

RADIAL FREQUENCY $f_r$

R. A. P. S.
(RADIALLY AVERAGED POWER SPECTRUM)

RADIAL FREQUENCY $f_r$

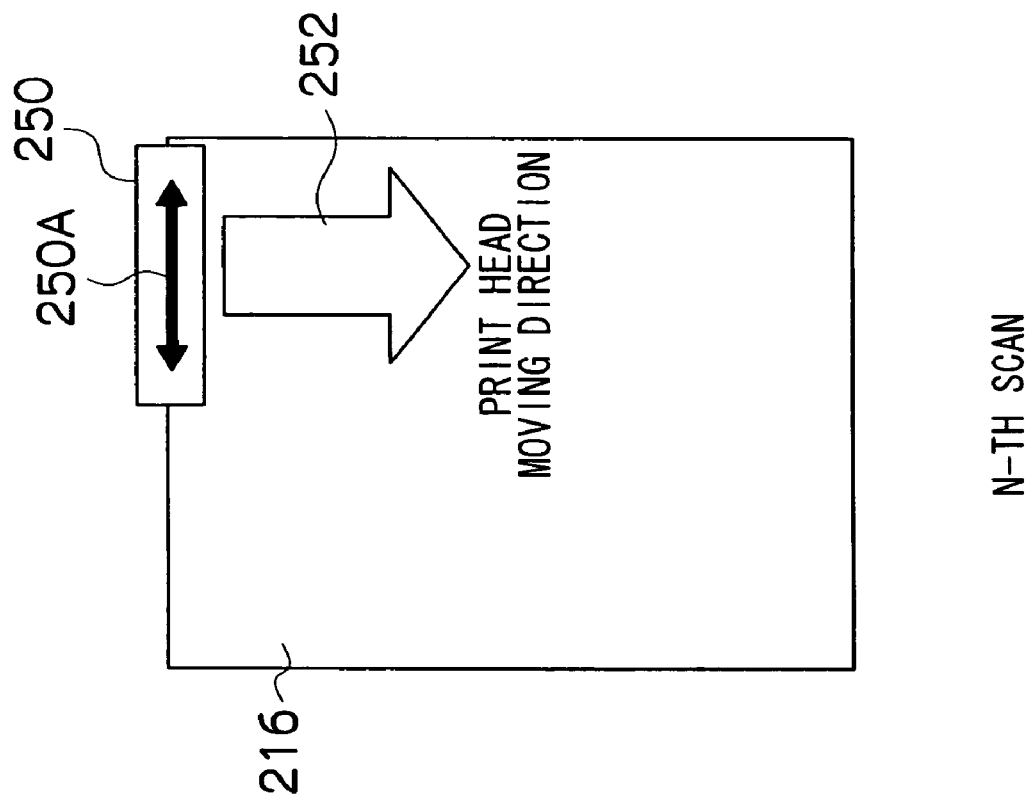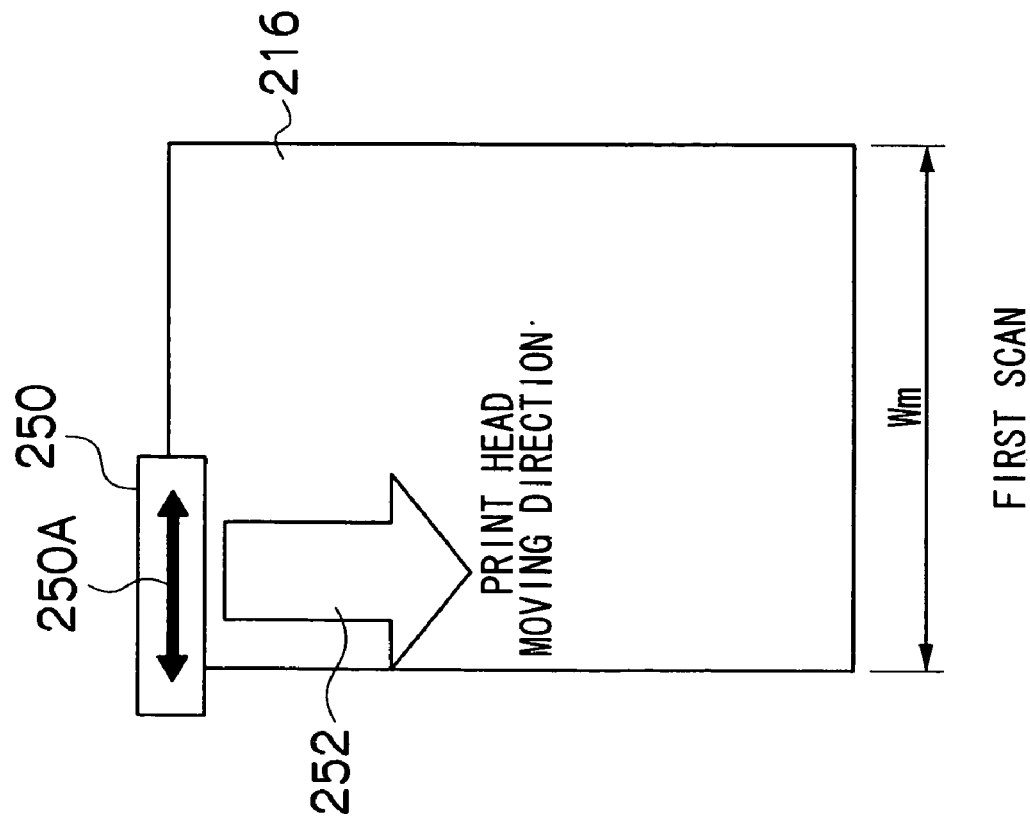

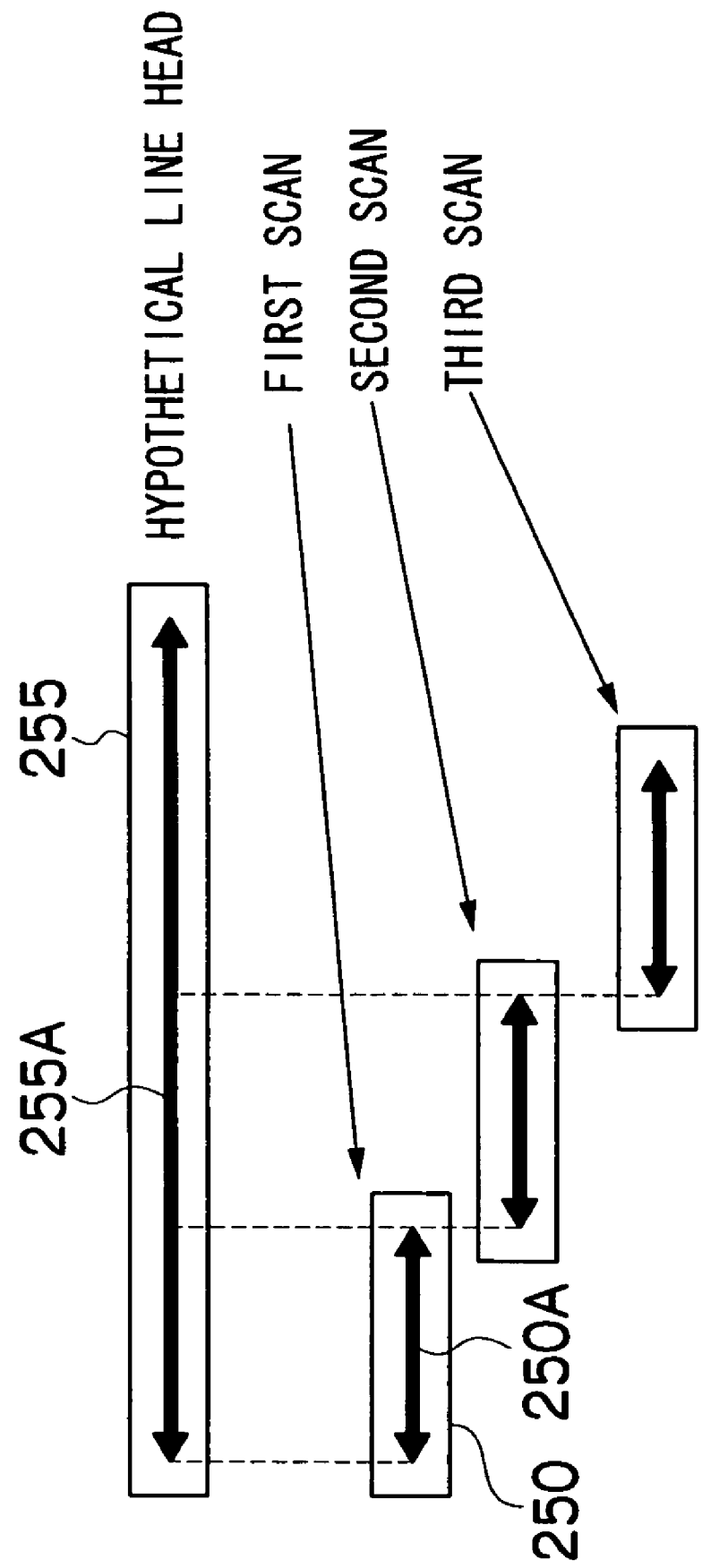

DOT ARRANGEMENT DETERMINATION METHOD, PROGRAM AND APPARATUS, THRESHOLD MATRIX CREATING METHOD AND PROGRAM, AND IMAGE FORMING APPARATUS

BACKGROUND OF THE INVENTION

1. Field of the Invention

The present invention relates to a dot arrangement determination method and apparatus suitable for forming pseudo gradation images, a method for creating a threshold matrix, a program for implementing the functions of these methods with a computer, and an image forming apparatus that uses a threshold matrix; and particularly relates to a halftone processing technique suitable for an inkjet recording apparatus or another image forming apparatus.

2. Description of the Related Art

In an inkjet recording apparatus, ink is deposited on recording paper or another such recording medium by ejecting ink droplets from the nozzles of a recording head (also referred to as a print head), and prints or images (hereinafter referred to collectively as "images") are recorded by these dots of deposited ink, but conditions may arise in which ink cannot be ejected from the nozzles for various reasons. For example, when a particular nozzle in a group of nozzles fails to eject, the dots that should have originally been deposited by the nozzle are missing, which results in unintended flaws in the form of lines (streaking) in the recorded image on the recording medium, and the image quality is reduced.

To deal with such problems in the prior art, a method is proposed to achieve a deposition arrangement (dot arrangement) wherein quality reduction in the recorded image resulting from deposited position misalignments due to nozzle ejection failure or ejection direction errors can be prevented (Japanese Patent Application Publication Nos. 2001-88328 and 2002-16803). Other proposals include a technique for performing a pseudo gradation process that improves graininess, that is suitable for photographic images, and that has excellent gradation reproducibility (Japanese Patent Application Publication No. 2002-16802), as well as a threshold matrix for obtaining a dot arrangement in which image quality reduction in areas of low resolution is prevented (Japanese Patent Application Publication No. 2004-15674).

However, in the techniques proposed in the prior art, the technique of reducing nonuniformities (in the line patterns or concentration) resulting from omitted dots (so-called "dot gaps") due to nozzle ejection failures or the like is not investigated in terms of visual characteristics, and the optimum dot arrangement based on visual characteristics is not determined.

Also, in Japanese Patent Application Publication Nos. 2002-16803 and 2002-16802, the characteristics of the dot arrangement achieved by image processing are described, but an optimization technique is not used in the method for achieving these characteristics.

SUMMARY OF THE INVENTION

The present invention has been contrived in view of such circumstances, and an object thereof is to provide a method and apparatus for determining a dot arrangement that use a combination of an evaluation function and an optimization technique based on the visual characteristics and that have the effects of reducing nonuniformities resulting from dot gaps, and to provide a method for creating a threshold matrix; another object of the present invention is to provide an image forming apparatus in which a program for executing this method with a computer and the threshold matrix created by this method are used.

In order to attain the aforementioned object, the present invention is directed to a dot arrangement determination method for determining an arrangement pattern when m dots (where m is a natural number) are arranged in a specific pixel area, the method comprising: a setting step of variably setting an arrangement pattern in which the m dots are arranged without overlapping at pixel positions in the specific pixel area; a first image evaluation value calculating step of calculating an image evaluation value of a halftone image formed by arranging the m dots in the specific pixel area in accordance with the arrangement pattern set in the setting step; a second image evaluation value calculating step of calculating an image evaluation value of a halftone image implemented according to the arrangement pattern set in the setting step when dots cannot be formed in an arbitrary pixel row in the specific pixel area; and a dot arrangement calculating step of determining the arrangement pattern with least image quality degradation for inability to form dots in an arbitrary pixel row in the specific pixel area by approximately solving a combinational optimization problem for the arrangement pattern using calculation results of the first and second image evaluation value calculating steps.

According to the present invention, the image evaluation value for evaluating the visible image of a halftone image with a dot arrangement used in the case of an inability to form dots is determined by the first image evaluation value calculating step, the image evaluation value when there is assumed to be an inability to form dots is determined by the second image evaluation value calculating step, and these image evaluation values and optimization techniques are used to determine the optimum dot arrangements. Therefore, it is possible to obtain dot arrangements with little image quality degradation for dot gaps originating from defects in the image recording elements.

Preferably, simulated annealing is used as an optimization technique for approximately solving the combinational optimization problem.

The optimum solution can be reached without resorting to the local optimum solution by using simulated annealing (SA), and an approximate solution can be calculated in a practical amount of time. Instead of simulated annealing, another possibility is to use a genetic algorithm (GA) or another such optimization technique.

Preferably, the image evaluation value includes a value for evaluating at least one of graininess and anisotropy.

It is preferable to take into account graininess or anisotropy for the evaluation index of the dot pattern.

Preferably, the image evaluation value is calculated using a dot evaluation function comprising a linear combination of a graininess evaluation function and an anisotropy evaluation function.

A more preferred evaluation is possible by taking into account both graininess and anisotropy.

Preferably, the dot arrangement calculation step comprises a fluctuation evaluation value calculating step of calculating a fluctuation evaluation value that indicates fluctuation in the image evaluation value resulting from inability to form dots, based on calculation results of the first and second image evaluation value calculating steps.

A dot arrangement with little fluctuation in the image evaluation value due to dot gaps can be determined by taking into account the fluctuation evaluation value.

Preferably, the dot arrangement calculating step further comprises an evaluation value calculating step of calculating an evaluation value comprising a linear combination of the image evaluation value obtained in the first image evaluation value calculating step and the fluctuation evaluation value obtained in the fluctuation evaluation value calculating step.

It is possible to obtain satisfactory image quality when there are no dot gaps, and at the same time to determine an optimum dot arrangement with little image quality degradation even when dot gaps occur, by using an evaluation value from a linear combination of an image evaluation value when there are no dot gaps and a fluctuation evaluation value resulting from dot gaps.

Preferably, when a dot arrangement with a larger dot number than an already determined dot arrangement is to be determined, an arrangement pattern is determined in which dots equal to a number of additional dots are newly arranged in pixel positions where no dots are arranged in the already determined dot arrangement while the already determined dot arrangement is maintained; and when a dot arrangement with a smaller dot number than the already determined dot arrangement is to be determined, an arrangement pattern is determined in which dots equal to a dot number equivalent to a difference between the dot number of the already determined dot arrangement and a dot number to be next determined are subtracted from the already determined dot arrangement.

As a result of this configuration, it is possible to maintain a relationship in which a dot arrangement with a large dot number always encompasses a dot arrangement with a smaller dot number, and to determine the dot arrangements for all the dot numbers.

In order to attain the aforementioned object, the present invention is also directed to a method for creating a threshold matrix, comprising: a dot array set creating step of determining dot arrangements for all dot numbers from a smallest dot number to a largest dot number using the above-described dot arrangement determination method, and creating a dot array set having the dot arrangements for these dot numbers as elements; and a threshold matrix creating step of creating a threshold matrix by sequentially assigning thresholds to the pixel positions in a matrix corresponding to the pixel positions in which dots are newly added and arranged, according to the dot arrangements of the dot numbers obtained in the dot array set creating step.

According to the present invention, since a threshold matrix is created based on the optimum dot arrangement determined using the optimization technique, fast screening unaffected by dot gaps can be performed.

In order to attain the aforementioned object, the present invention is also directed to a computer readable medium having embodied thereon a dot arrangement determination program for performing, by a computer, determination of an arrangement pattern when m dots (where m is a natural number) are arranged in a specific pixel area, the dot arrangement determination program comprising: a first code segment for a setting step of variably setting an arrangement pattern in which the m dots are arranged without overlapping at pixel positions in the specific pixel area; a second code segment for a first image evaluation value calculating step of calculating an image evaluation value of a halftone image formed by arranging the m dots in the specific pixel area in accordance with the arrangement pattern set in the setting step; a third code segment for a second image evaluation value calculating step of calculating an image evaluation value of a halftone image implemented according to the arrangement pattern set in the setting step when dots cannot be formed in an arbitrary pixel row in the specific pixel area; and a fourth code segment for a dot arrangement calculating step of determining the arrangement pattern with least image quality degradation for inability to form dots in an arbitrary pixel row in the specific pixel area by approximately solving a combinational optimization problem for the arrangement pattern using calculation results of the first and second image evaluation value calculating steps.

Preferably, the dot arrangement determination program further comprises: a fifth code segment for, when a dot arrangement with a larger dot number than an already determined dot arrangement is to be determined, determining an arrangement pattern in which dots equal to a number of additional dots are newly arranged in pixel positions where no dots are arranged in the already determined dot arrangement while the already determined dot arrangement is maintained; and a sixth code segment for, when a dot arrangement with a smaller dot number than the already determined dot arrangement is to be determined, determining an arrangement pattern in which dots equal to a dot number equivalent to a difference between the dot number of the already determined dot arrangement and a dot number to be next determined are subtracted from the already determined dot arrangement.

In order to attain the aforementioned object, the present invention is also directed to a computer readable medium having embodied thereon a threshold matrix creating program for performing, by a computer, creation of a threshold matrix, the threshold matrix creating program comprising: a first code segment for a dot array set creating step of determining dot arrangements for all dot numbers from a smallest dot number to a largest dot number using the above-described dot arrangement determination program, and creating a dot array set having the dot arrangements for these dot numbers as elements; a second code segment for a threshold matrix creating step of creating a threshold matrix by sequentially assigning thresholds to the pixel positions in a matrix corresponding to the pixel positions in which dots are newly added and arranged, according to the dot arrangements of the dot numbers obtained in the dot array set creating step.

The medium may be a propagated signal, which may be a carrier wave.

The program for the dot arrangement determination process or the program for creating a threshold matrix according to the present invention can be used on a personal computer or another such computer system. Also, the program according to the present invention may be configured as individual application software, or incorporated as part of image editing software or another such application. The program for creating a threshold matrix is configured to encompass the program for the dot arrangement determination process.

The programs according to the present invention can be stored on a CD-ROM, a magnetic disk, or another information storage medium (external storage apparatus), and the programs can be provided to a third party via the information storage medium, or a download service for the program can be provided through the Internet or another type of communication line.

In order to attain the aforementioned object, the present invention is also directed to a dot arrangement determination apparatus which performs calculations for determining an arrangement pattern when m dots (where m is a natural number) are arranged in a specific pixel area, the apparatus comprising: a setting device which variably sets an arrangement pattern in which the m dots are arranged without overlapping at pixel positions in the specific pixel area; a first image evaluation value calculating device which calculates an image evaluation value of a halftone image formed by arranging the m dots in the specific pixel area in accordance with the arrangement pattern set by the setting device; a second image evaluation value calculating device which calculates an image evaluation value of a halftone image implemented according to the arrangement pattern set by the setting device when dots cannot be formed in an arbitrary pixel row in the specific pixel area; and a dot arrangement calculating device which determines the arrangement pattern with least image quality degradation for inability to form dots in an arbitrary pixel row in the specific pixel area by approximately solving a combinational optimization problem for the arrangement pattern using results calculated by the first and second image evaluation value calculating devices.

In order to attain the aforementioned object, the present invention is also directed to an image forming apparatus, comprising: an image processing device which performs digital halftoning using the threshold matrix created by the above-described threshold matrix creating method; a recording head which has an image recording element row in which are arrayed a plurality of image recording elements that are driven according to dot data generated by the image processing device; and a conveyance device which moves the recording head and a recording medium relatively to each other by conveying at least one of the recording head and the recording medium.

A full-line head with an image recording element row in which a plurality of image recording elements (recording elements for forming dots) are arrayed across a length corresponding to the entire width of the recording medium can be used as a structural example of the recording head in the image forming apparatus of the present invention. In this case, a plurality of relatively short recording head modules with an image recording element row that does not extend over a length corresponding to the entire length of the recording medium are combined, and these modules are joined together to configure an image recording element row with a length corresponding to the entire width of the whole recording medium.

A full line type head is usually disposed in a direction perpendicular to the relative feed direction (relative conveyance direction) of the recording medium, but modes may also be adopted in which the ejection head is disposed following an oblique direction that forms a prescribed angle with respect to the direction perpendicular to the relative conveyance direction.

The "recording medium" is a medium on which an image is recorded by the operation of the recording head (can also be referred to as an image formed medium, recorded medium, recording medium, image receiving medium, ejection medium in the case of an inkjet recording apparatus, or ejected medium), and includes continuous paper, cut paper, sealed paper, OHP sheets or other resinous sheets, films, cloth, intermediate transfer mediums, print substrates on which a wiring pattern is printed by an inkjet recording apparatus, and other various mediums regardless of material or shape.

The "conveying device" may have an aspect in which the recording medium is conveyed relative to a stopped (fixed in place) recording head, an aspect in which the recording head is moved relative to a stopped recording medium, or an aspect in which both the recording head and recording medium are moved.

In the case of an inkjet head, which is one embodiment of a recording head, the image recording elements are droplet ejecting elements that include nozzles for ejecting an ink solution. When color images are formed by an inkjet head, a recording head may be provided for each of a plurality of ink colors (recording solutions), or a plurality of ink colors can be ejected from one recording head.

According to the present invention, an approximate solution method for the optimization problem is used together with the image evaluation value for evaluating the visible quality of a halftone image resulting from the dot arrangement to determine the optimum dot arrangement, and therefore a dot arrangement with little image quality degradation can be determined for dot gaps resulting from defects in the image recording elements. Also, a threshold matrix can be created by using an algorithm for determining the dot arrangement, and conversion to a pseudo gradation image that is not affected by dot gaps can therefore be achieved by performing digital halftoning using the threshold matrix.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 20A and 20B are schematic views showing an example of an embodiment in which images are formed using a scanning print head;

FIG. 21 is an explanatory diagram showing the relationship between multiple scan cycles and a hypothetical line head.

DETAILED DESCRIPTION OF THE PREFERRED EMBODIMENTS

Description of Dot Arrangement Determination Method

First, the basic flow of a method for determining the dot arrangement using simulated annealing (SA) will be described.

Simulated annealing is an approximate solution method for combinational optimization problems, and is particularly a method that mathematically models the physical phenomenon of annealing (a method of gradually lowering the temperature from a high temperature to create a stable crystal structure). It is known that local searching, typified by the so-called hill climbing method, is sometimes tapped in a "local optimal solution," and the true "optimal solution" cannot be reached. In this respect, simulated annealing works to select a solution in an energetically deteriorating direction by a certain probability, wherein the probability of selecting a solution in an energetically deteriorating direction increases as the temperature increases, and the probability decreases as the temperature decreases. Thus, since there is a possibility that simulated annealing will select a solution in an energetically deteriorating direction, it is possible that there will be a deviation from the local optimum solution, and the probability of selecting a bad solution decreases as the temperature decreases, whereby it is feasible that simulated annealing will ultimately converge on the optimum solution.

Figure 1:
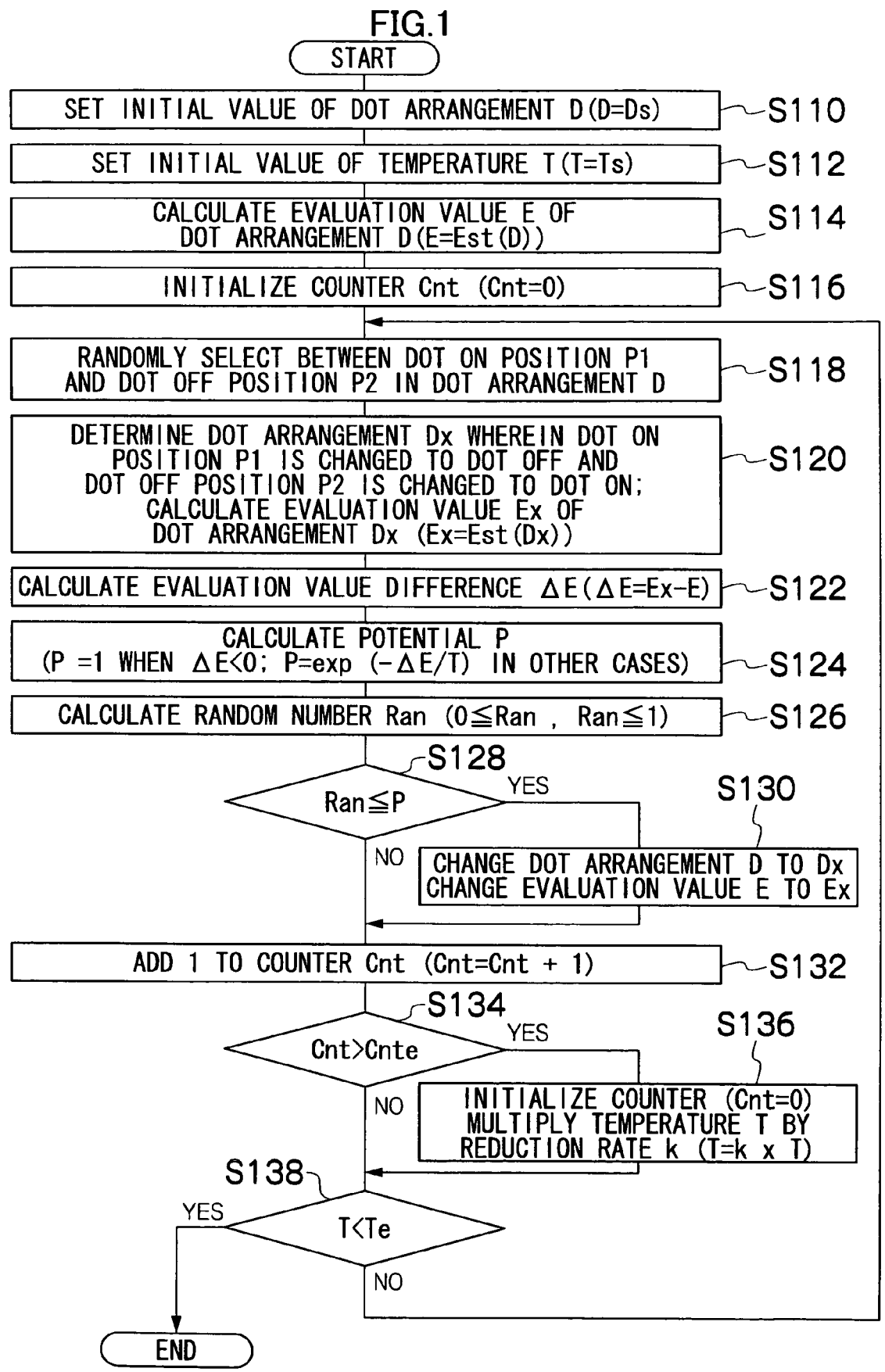
FIG. 1 is a flowchart showing the basic algorithm of a dot arrangement method that uses simulated annealing.

FIG. 1 is a flowchart showing the basic algorithm of a dot arrangement determination method that uses simulated annealing. In the present embodiment, a full-line inkjet recording head that has a nozzle row in which a plurality of nozzles (equivalent to image recording elements) are aligned over a length corresponding to the entire width of the recording medium is used as the device (image output apparatus) for outputting pseudo gradation images according to the dot arrangement. In this example, the recording head is used in an inkjet recording apparatus with a single-pass printing system in which images are formed in only one conveyance of the recording medium in the sub-scanning direction.

As shown in FIG. 1, when the algorithm process starts, first, the initial value Ds of the two-dimensional dot arrangement D in the digital image surface is set (step S110). The term "dot arrangement D" refers to the two-dimensional arrangement distribution (arrangement pattern) of an M number of dots (M is a natural number, or an integer of 1 or greater) in a specific two-dimensional image size (for example, I pixels×J pixels, wherein I and J are arbitrary positive integers).

The method for determining the initial value Ds is not particularly limited, and it is assumed that a random M number of dots are arranged arbitrarily, for example.

Next, the initial value Ts of the temperature T is set (step S112). The method for determining the initial value Ts is not particularly limited, and a suitable value is established, such as Ts=1000 degrees or Ts=2000 degrees, for example.

Thus, the dot arrangement D and the temperature T are both initialized at their initial values Ds and Ts, and an evaluation value E is calculated for this dot arrangement D=Ds (step S114).

The method for calculating the evaluation value E of the dot arrangement D will be described later, wherein the evaluation value E is calculated using an evaluation function (Est (D)) for evaluating image quality with consideration for the graininess and anisotropy of the dot arrangement D.

Next, a counter Cnt for counting the number of calculations is initialized (step S116) at an initial value "0"(Cnt=0).

Figure 2:
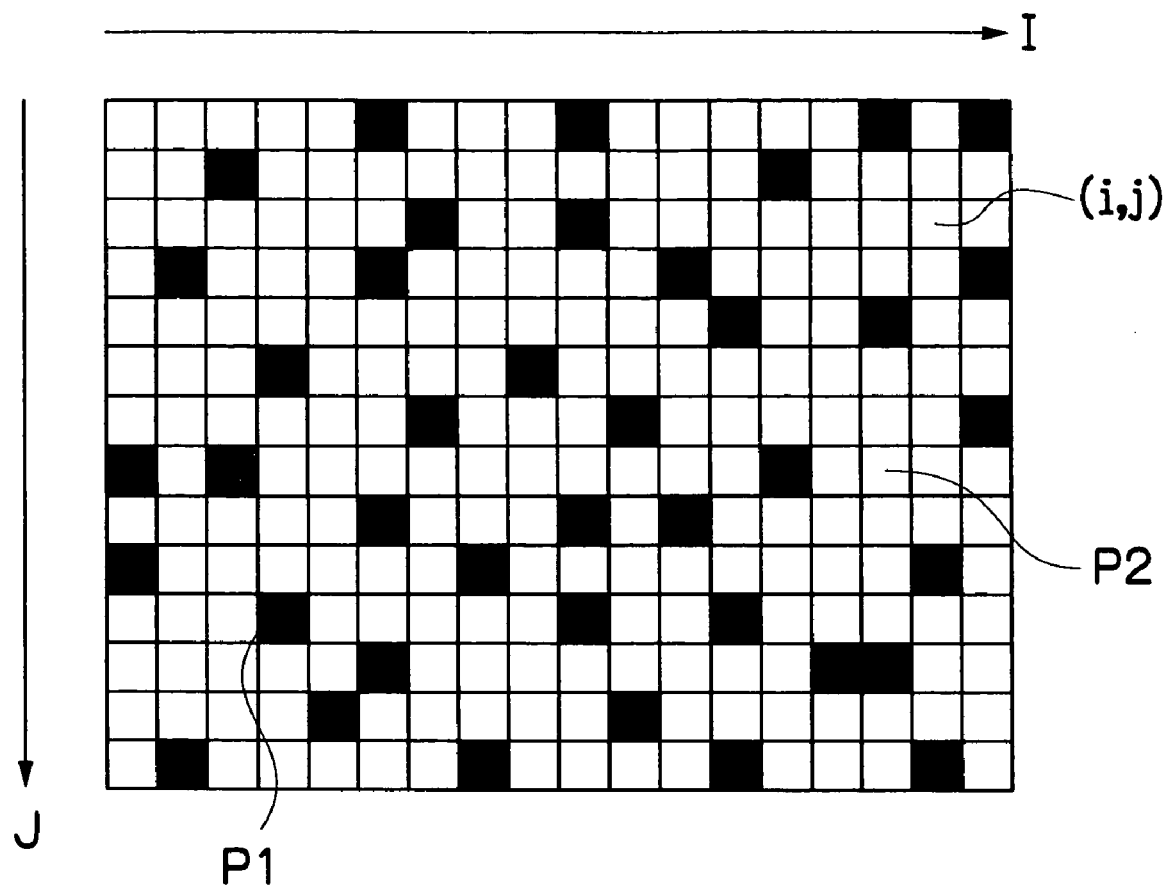
FIG. 2 is a schematic view showing an example of a dot arrangement.

Next, a random selection is made between the dot ON position P1 and the dot OFF position P2 in the given dot arrangement D (step S118). A conceptual diagram thereof is shown in FIG. 2. FIG. 2 is a schematic diagram in which pixel points (pixel positions) at which dots can be formed on an image surface are expressed as the rectangular measured cells (mesh) of a square lattice. In this diagram, the pixel positions shown in black indicate the dot ON positions (positions with dots), and the pixel positions shown in white in the diagram indicate the dot OFF positions (positions with no dots). In the actual apparatus, dots are formed that are closer to approximate circles than to the square regions indicating the pixel positions (i, j), and there are no gaps between dots when a solid image is printed.

As shown in FIG. 2, an M number of dots are arranged (with a certain dot arrangement D) in the pixel area I pixels×J pixels (wherein I and J are arbitrary positive integers), and one each of the dot ON position P1 and the dot OFF position P2 is randomly selected (step S118 in FIG. 1).

A dot arrangement Dx is then determined wherein the selected dot ON position P1 is changed to dot OFF, the dot OFF position P2 is changed to dot ON, and an evaluation value Ex (Ex=Est(Dx)) is calculated for the dot arrangement Dx resulting from this change (step S120).

Next, the difference between the evaluation value E of the dot arrangement D and the evaluation value Ex of the changed dot arrangement Dx (evaluation value $\Delta E$) is calculated (step S122). More specifically, the evaluation value difference $\Delta E = Ex - E$ is calculated.

A potential P is calculated from the evaluation value difference $\Delta E$ determined in this manner (step S124). The potential P is defined according to the evaluation value difference $\Delta E$, wherein $P=1$ when $\Delta E<0$, and $P=\exp(-\Delta E/T)$ when $\Delta E \geq 0$. The definition of the potential P is established based on the relationship between a random number in the next step S126, and the inequality criterion in step S128.

In step S126, a random number Ran is generated in a range of 0 to 1. In the next step S128, the magnitude correlation between the random number Ran and the potential P is estimated, and it is determined whether the inequality $Ran \leq P$ is satisfied.

Since the random number Ran is a number from 0 to 1, if the potential P=1, then the inequality criterion in step S128 will always be YES. In other words, this means that in the direction in which the evaluation value difference $\Delta E$ is negative, YES will always be selected and the process will advance to step S130.

However, when the evaluation value difference $\Delta E$ is 0 or greater, the potential P is defined by $P=\exp(-\Delta E/T)$, and therefore P at this time will be a value in a range of $0<P \leq 1$.

The value of P is near "1" when the temperature T is high, and the value of P gradually draws near to "0" as the temperature T decreases.

Since the random number Ran tends to stochastically reach a value near 0.5, the inequality criterion in step S128 has a high probability of being YES when the temperature T is high. Also, as the temperature T decreases, the inequality criterion in step S128 has a higher probability of being NO.

When the determination is YES in step S128, the process advances to step S130, wherein the dot arrangement D is changed to Dx and the evaluation value E is changed to Ex. This means that a dot arrangement Dx in which ON/OFF in the positions P1 and P2 is switched is adopted, that this arrangement is read instead of the dot arrangement D, and that the evaluation value Ex is read instead of the evaluation value E.

After step S130, the process advances to step S132, and the value of the counter Cnt is counted up "+1". When the determination is NO in step S128, the evaluation value Ex and the dot arrangement Dx are nullified and the process advances to step S132.

Next, it is determined whether the total value of the counter Cnt exceeds a specific iterative stipulated value Cnte (step S134). This iterative stipulated value Cnte is set with consideration for the fact that the calculation becomes more difficult when the calculation for reducing the temperature T is executed for each loop, in order to conduct a process in which the temperature is lowered by a specific amount when the calculation is repeated and a Cnte cycle counter is run for the same temperature for a specific number of repetitions (Cnte times).

More specifically, if the outcome in S 134 is NO, it is estimated whether the temperature T has fallen below the final temperature Te (step S138), and if the result is NO, the process returns to step S118, new P1 and P2 are selected, and the process described above is repeated.

However, if the total value of the counter Cnt exceeds the specific iterative stipulated value Cnte in step S134, the process advances to step S136, the counter Cnt is initialized (Cnt=0), the current temperature T is multiplied by a specific rate of reduction k (k is a positive number less than 1), and the temperature T is changed to T=kT (step S136). After step S136, the process advances to step S138, and a comparison is drawn with the final temperature Te. If the result is NO in step S138, the process returns to step S118.

The process in steps S118 through S138 is repeated, and if the temperature T is less than the final temperature Te in step S138, the process is complete. Thus, a dot arrangement with a low evaluation value E can be obtained.

Next, an example of calculating the evaluation value E will be described.

The dot arrangement D is a two-dimensional arrangement pattern of dots in the pixel area I×J as described in FIG. 2, and is expressed as the dot arrangement D (i, j) ($0 \leq i, i < I, 0 \leq j, j < J$), where the main scanning direction in single-pass printing with a full-line recording head is expressed by the variable i, and the sub-scanning direction is expressed by the variable j). A dot evaluation function EDot is defined below as an example of the method for calculating the evaluation value E for this dot arrangement D (i, j).

The dot evaluation function EDot is a linear combination of a graininess evaluation function and an anisotropy evaluation function, and is expressed by the following equation (Eq. A):

$$EDot(D) = wg \times \text{Graininess evaluation function } (D) + wa \times \text{Anisotropy evaluation function } (D),$$ (Eq. A)

where wg and wa are weighting factors.

The anisotropy and the average index (Radially Averaged Power Spectrum; R.A.P.S.) of a radial-coordinate power spectrum in the dot luminosity distribution proposed by Robert Ulichney can be used as the graininess evaluation function and the anisotropy evaluation function.

A dot placement is obtained as a result of digital halftoning, and a method proposed by Robert Ulichney ("Digital Halftoning"; published by The MIT Press) is typically used as a method of evaluating the dot placement (dot arrangement).

Figure 3:
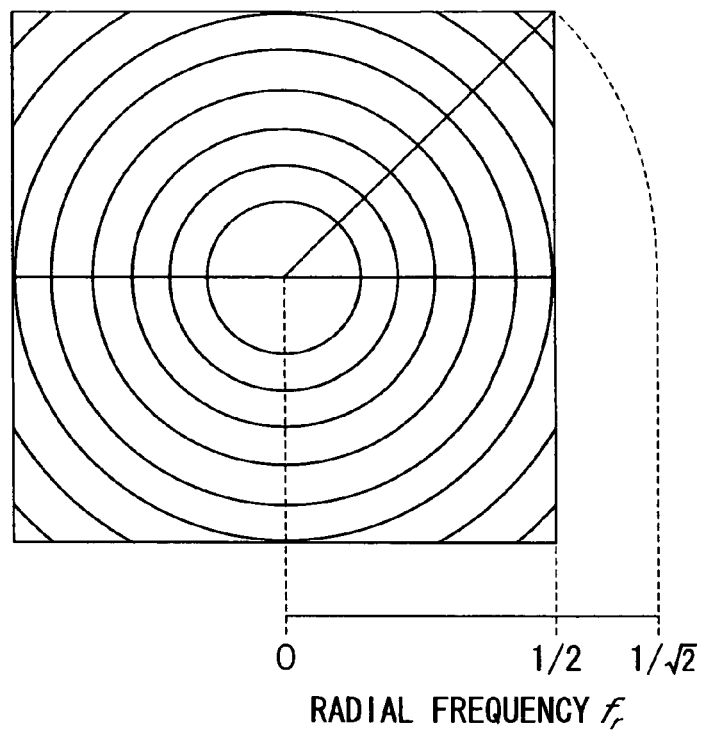
FIG. 3 is a view showing a coordinate system for calculating a two-dimensional power spectrum.

More specifically, the two-dimensional power spectrum of the dot placement is converted to radial coordinates, as in FIG. 3, and the index corresponding to the average and dispersion of the spectrum at all angles is calculated for the spatial frequency fr corresponding to the radius of the radial coordinates.

The average index of the polar-coordinate power spectrum is referred to as "radially averaged power spectrum (R.A.P.S.)" and is expressed by the following equation:

$$P_r(f_r) = \frac{1}{N_r(f_r)} \sum_{i=1}^{N_r(f_r)} \hat{P}(f).$$

The dispersion index is referred to as "anisotropy" and is expressed by the following equation:

$$s^2(f_r) = \frac{1}{N_r(f_r) - 1} \sum_{i=1}^{N_r(f_r)} (\hat{P}(f) - P_r(f_r))^2$$

$$\text{anisotropy} = \frac{s^2(f_r)}{P_r^2(f_r)}.$$

The radially averaged power spectrum (R.A.P.S.) is a spectrum related to the visibility of the dot placement, and the anisotropy is the index pertaining to the anisotropy of the dot arrangement.

Figure 4:
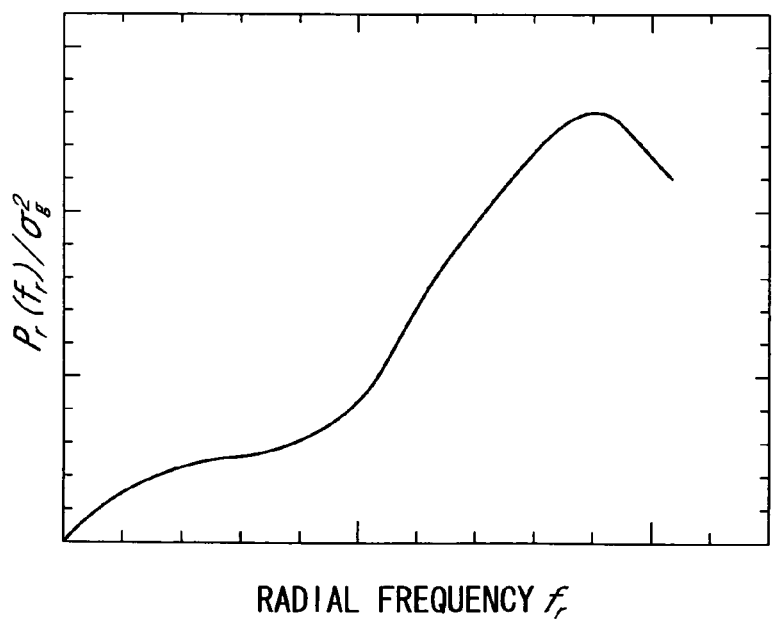
FIG. 4 is a graph showing an example of an average index of a polar coordinate power spectrum (R.A.P.S.) calculated under certain conditions.

An example of R.A.P.S. calculated under certain preferable conditions is shown in FIG. 4. In FIG. 4, $\sigma_g$ is expressed by the following equation:

$$\sigma_g = g(1-g),$$

where g is the normalized inputted value, and $0 \leq g \leq 1$.

Figure 5:
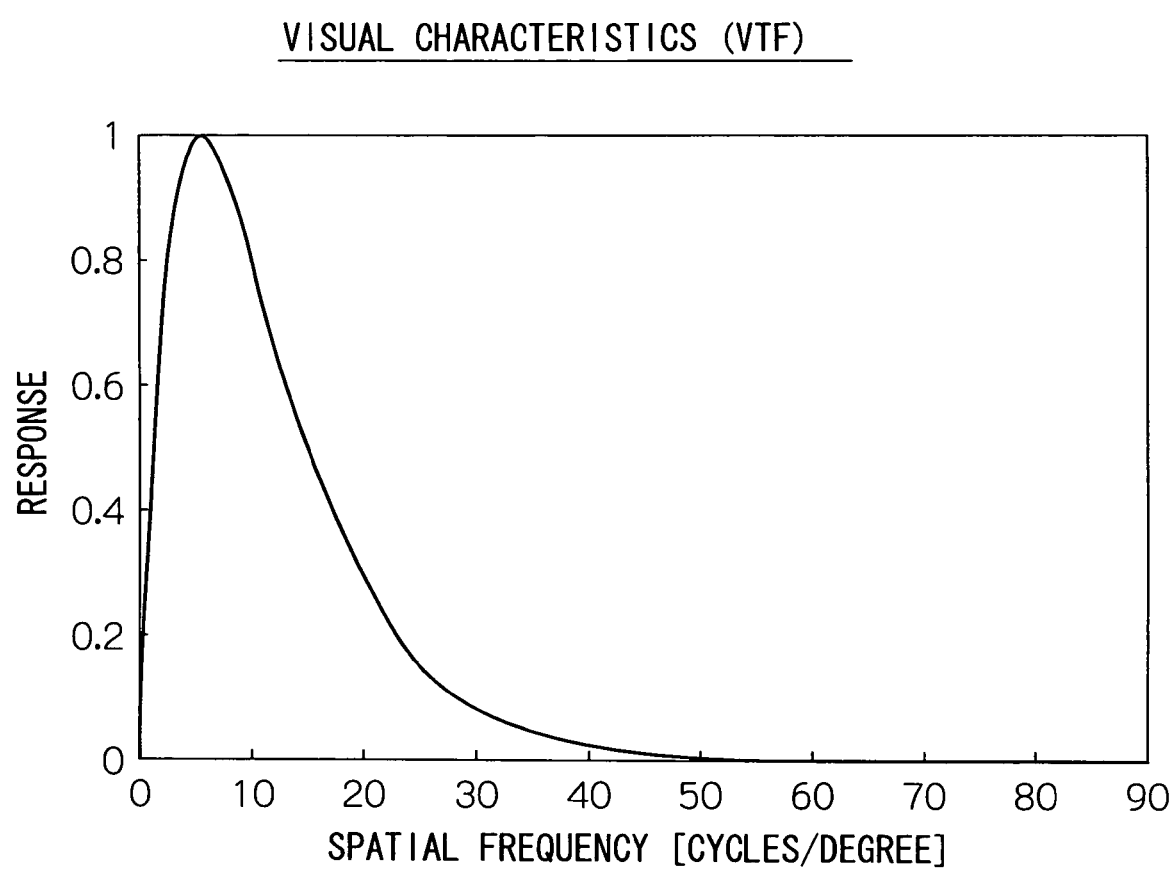
FIG. 5 is a graph showing the visual characteristic of a human eye (VTF)

In the graph shown in FIG. 4, the visibility characteristic is not taken into account. However, by taking into account (multiplying) the well-known visibility characteristic (visual transfer function (VTF)) shown in FIG. 5, the overall energy is suppressed to a low level. Note that the VTF used when calculating the R.A.P.S. and anisotropy is not limited to that proposed by Dooly and Shaw, and another well-known VTF may be used.

Figure 6:
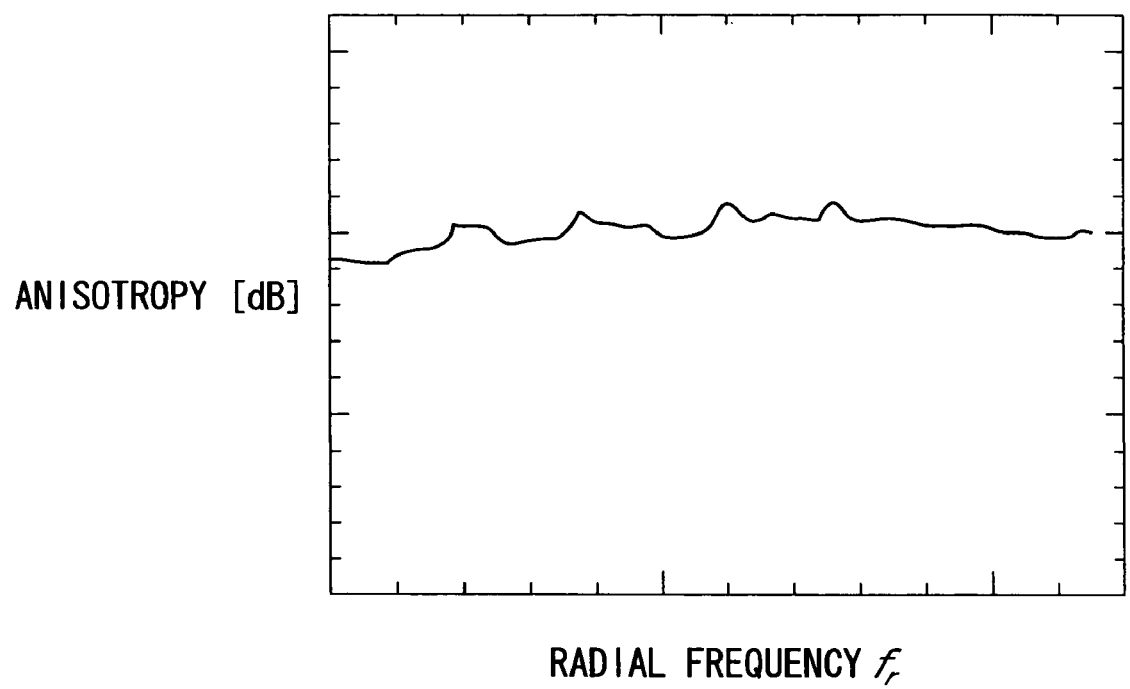
FIG. 6 is a graph showing an example of the distribution index (anisotropy) of a polar coordinate power spectrum calculated under certain conditions.

FIG. 6 shows an example of the anisotropy calculated under certain preferred conditions. According to Robert Ulichney, the dot anisotropy ceases to be noticeable when the anisotropy is −10 decibels (dB) or less.

In the present embodiment, the dot evaluation function EDot (D) is defined by the above Eq. (A), wherein the R.A.P.S. is used for the graininess evaluation function (D), and the anisotropy is used for the anisotropy evaluation function (D).

The dot evaluation function EDot (D) is used as follows. First, EDot is calculated for a case in which there are no nozzle ejection failures, and the calculation result is set as EDotA. Next, EDot is calculated for a case in which a nozzle (hereinbelow referred to as the i-th nozzle) for forming dots at the i-th pixel position fails to eject, and the calculation result is set as EDoti. When the i-th nozzle fails to eject, dots cannot be formed with this nozzle, the nozzle is set to dot OFF for the i-th position in the dot arrangement D, and EDot is calculated. It can be assumed that a lower EDot value results in a better evaluation.

Next, a fluctuation evaluation value EDelta based on the nozzle ejection failure is calculated. With this fluctuation evaluation value EDelta, the degrading of the dot evaluation function EDot resulting from the nozzle ejection failure is calculated. An example of calculating the fluctuation evaluation value EDelta is shown below.

$$E\text{Delta} = \Sigma\{E\text{Dot}i - E\text{Dot}A\} \ (0 \leq i, i < I) \quad \text{(Calculation Example 1)}$$

$$E\text{Delta} = \text{MAX}(E\text{Dot}i - E\text{Dot}A) \ (0 \leq i, i < I) \quad \text{(Calculation Example 2)}$$

In the above Calculation Example 1, EDoti is calculated for (EDotA) with no defects, assuming that one nozzle each failed to eject sequentially among all the nozzles, and the difference is calculated based on EDotA, whereby the amount by which EDot has degraded due to ejection failure is determined, and the amount of degradation is added to all the nozzles. In other words, Calculation Example 1 calculates a value equivalent to the average value of degradation of the dot evaluation function EDot resulting from the nozzle ejection failure.

In Calculation Example 2, a value equivalent to the value (lowest value) obtained when the dot evaluation function EDot is most degraded due to ejection failure is calculated for a case in which there are no defects (EDotA).

The fluctuation evaluation value EDelta calculated according to the definition of either Calculation Example 1 or Calculation Example 2 shown above is an index for showing that fluctuation has deteriorated due to ejection failure. The objective is a dot arrangement in which the fluctuation evaluation value EDelta is preferably at its lowest (a dot arrangement with the least fluctuation due to ejection failures), because nonuniformities due to dot gaps are indistinctive when there are nozzle ejection failures.

Therefore, the final evaluation value E described in FIG. 1 is defined by a linear combination of the fluctuation evaluation value EDelta and the dot evaluation value EDotA when there are no ejection failures, as shown by the following formula. (Eq. B).

$$E = \text{Est}(D) = w\text{delta} \times E\text{Delta} + w\text{dot} \times E\text{Dot}A \quad \text{(Eq. B)}$$

where wdelta and wdot are weighting factors.

As shown in Eq. B, defining the evaluation value E by a linear combination of EDelta and EDotA makes it possible to obtain a satisfactory dot arrangement in which fluctuation is low when there are dot gaps, and graininess is satisfactory and anisotropy is low when there are no dot gaps.

Using the calculation flow described above makes it possible to calculate a satisfactory dot arrangement when there are M dots (a dot arrangement in which nonuniformities due to dot gaps are indistinctive, and image quality is satisfactory when there are no dot gaps).

Below is a description of a method for determining the dot arrangement for a case in which the number of dots has increased or decreased, on the basis of the optimum dot arrangement with M dots determined by the method described above. A final aspect of note in the present embodiment is that the optimum dot arrangement is determined for each number of dots from the smallest dot number to the largest dot number, and the threshold matrix is determined based on these dot arrangements.

"Procedure 1" First, the basic flowchart of simulated annealing described in FIG. 1 is used to determine the optimum dot arrangement DP (M) with an appropriate dot number M.

Figure 7:
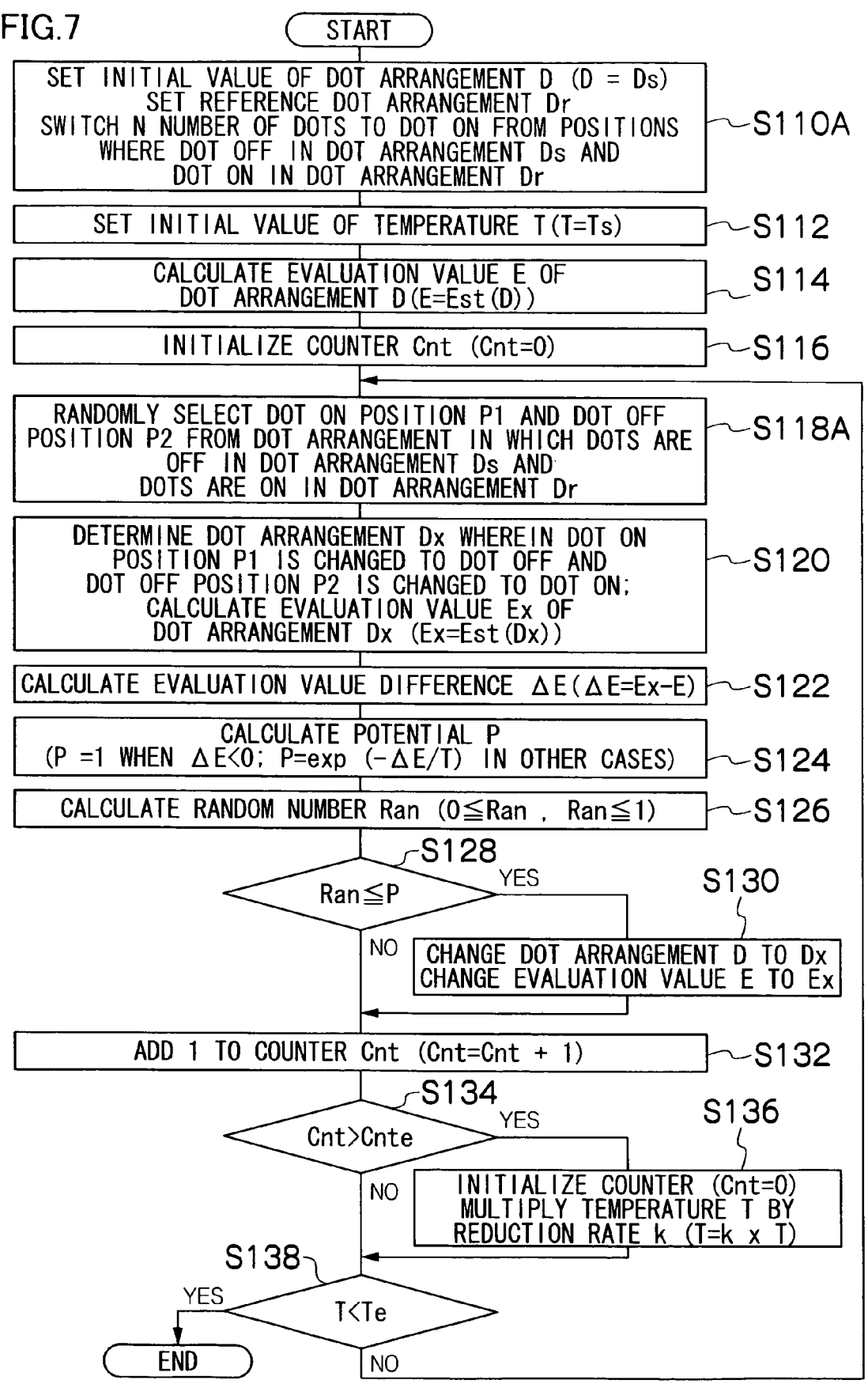
FIG. 7 is a flowchart showing the procedure of determining the dot arrangement for a case in which the dots have increased from the reference dot arrangement.

"Procedure 2" Next, a dot arrangement DP (M+Q) in which an appropriate number Q of dots in the dot arrangement DP (M) are further brought into the dot ON state is determined using the flowchart shown in FIG. 7 (FIG. 7 will be described later). In other words, Q dots are to other positions and a calculation is performed without changing the already confirmed arrangement of M dots.

Figure 8:
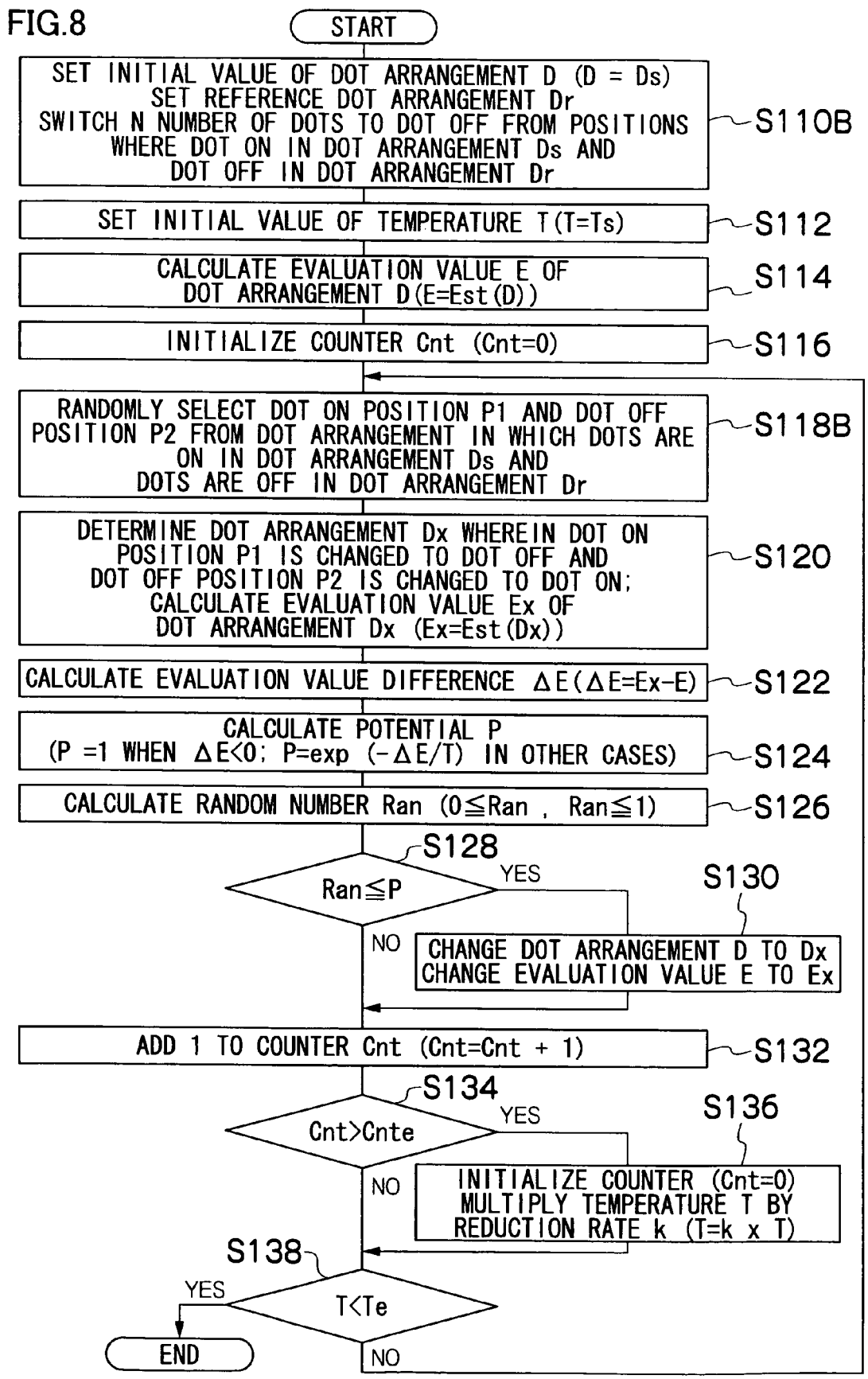
FIG. 8 is a flowchart showing the procedure of determining the dot arrangement for a case in which the dots have decreased from the reference dot arrangement.

"Procedure 3" Also, by the same reasoning, a dot arrangement DP (M−R) in which an appropriate number R of dots in the dot arrangement DP (M) are brought into the dot OFF state can be determined (FIG. 8 will be described later).

Figure 9:
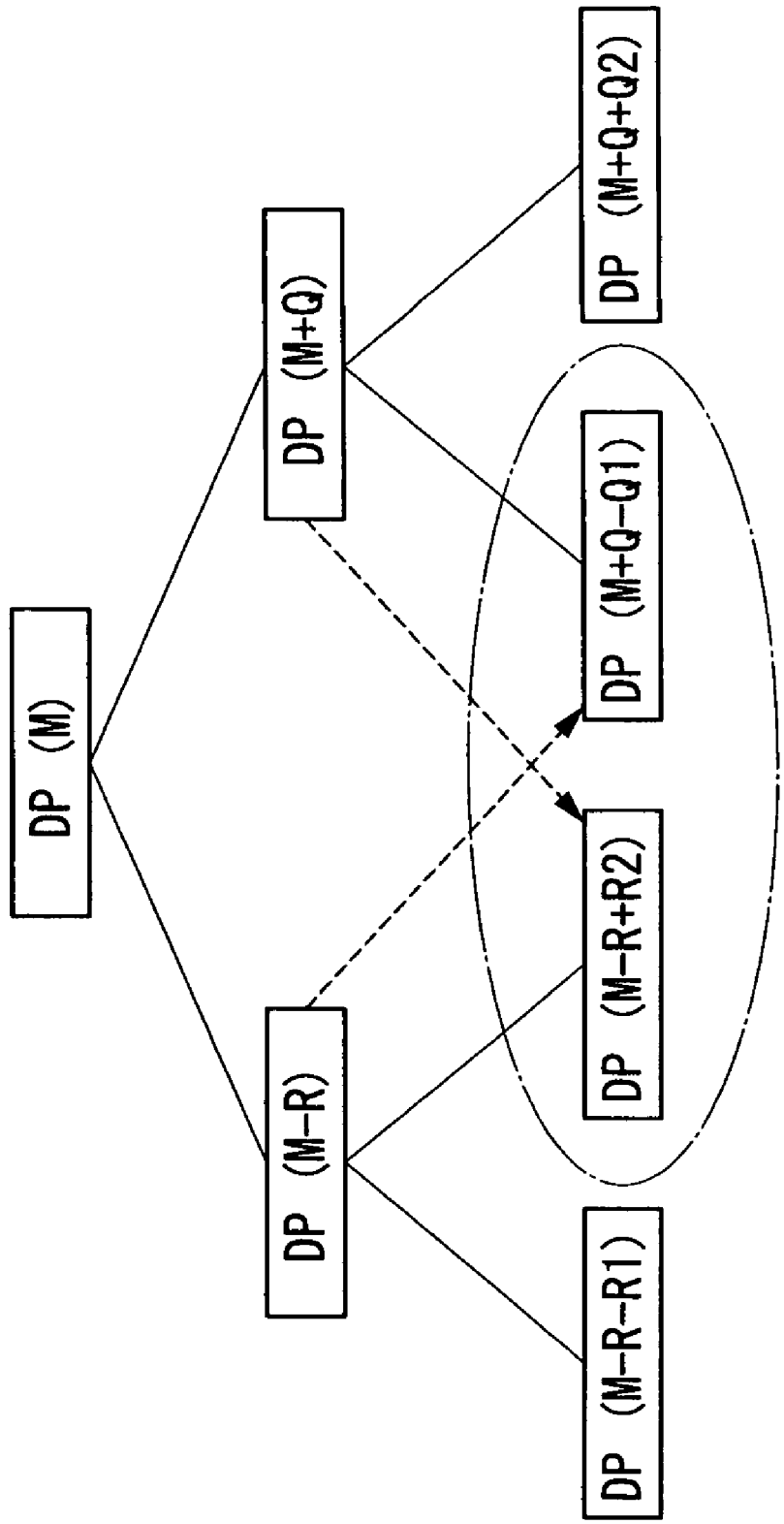
FIG. 9 is a conceptual view schematically showing how dot arrangements with different dot numbers are sequentially determined.

Dot arrangements with different dot ON numbers (numbers of dots) can be determined as shown in FIG. 9 by repeating the same calculations in Procedures 2 and 3. FIG. 9 is a conceptual diagram showing a schematic view of the manner in which a dot arrangement is determined from the dot arrangement DP (M), starting from the top and proceeding sequentially downward in the diagram while increasing or reducing the number of dots. More specifically, dot arrangements DP (M+Q) and DP (M−R) are determined from the dot arrangement DP (M), and a calculation is performed to determine DP (M+Q−Q1) in which Q1 dots are subtracted from DP (M+Q), and DP (M+Q+Q2) in which Q2 dots are added to DP (M+Q). Also, DP (M−R−R1) with R1 number of dots subtracted from DP (M−R), and DP (M−R+R2) with R2 number of dots added to DP (M−R) are determined.

When, for example, DP (M−R+R2) is determined, the R2 dots that are ON must be restricted to dot OFF positions in DP (M−R) and dot ON positions in DP (M+Q). Similarly, when DP (M+Q−Q1) is determined, the Q1 dots that are OFF must be restricted to dot OFF positions in DP (M−R) and dot ON positions in DP (M+Q).

A restrictive dot arrangement is defined as follows, such as one described above with a certain dot number (X) at which the dot arrangement is determined from these formulas.

More specifically, when an attempt is made to determine the dot arrangement of the dot number in the direction in which the dot ON positions are added (the dot number is increased) to the already determined dot arrangement, the dot number is nearest in the direction in which the dot number decreases in terms of the dot number X to be determined, and the already determined dot arrangement is assumed to be "Ds" (initial arrangement). Also, the dot number is nearest in the direction in which the dot number increases in terms of the dot number X, and the already determined dot arrangement is assumed to be "Dr" (reference dot arrangement).

In other words, the ON positions of (X−Ds) dots (the positions of the dots added in relation to Ds) are determined from the difference set between the set of Dr dot ON positions and the set of Ds dot ON positions. A flowchart in which the optimum dot arrangement is determined under such restrictions is shown in FIG. 7.

Alternatively, when an attempt is made to determine the dot arrangement of a dot number in the direction in which the dot ON positions are reduced (the dot number is reduced) from a dot arrangement that has already been determined, the dot number is nearest in the direction in which the dot number increases in terms of the dot number X to be determined, and the already determined dot arrangement is assumed to be "Ds" (initial arrangement). Also, the dot number is nearest in the direction in which the dot number decreases in terms of the dot number X, and the already determined dot arrangement is assumed to be "Dr" (reference dot arrangement).

In other words, the OFF positions of (Ds−X) dots (the positions of the dots subtracted from Ds) are determined from the difference set between the set of Ds dot ON positions and the set of Dr dot ON positions (in an actual calculation, the dot ON positions added to Dr are accordingly determined). A flowchart in which the optimum dot arrangement is determined under such restrictions is shown in FIG. 8.

Figure 10:
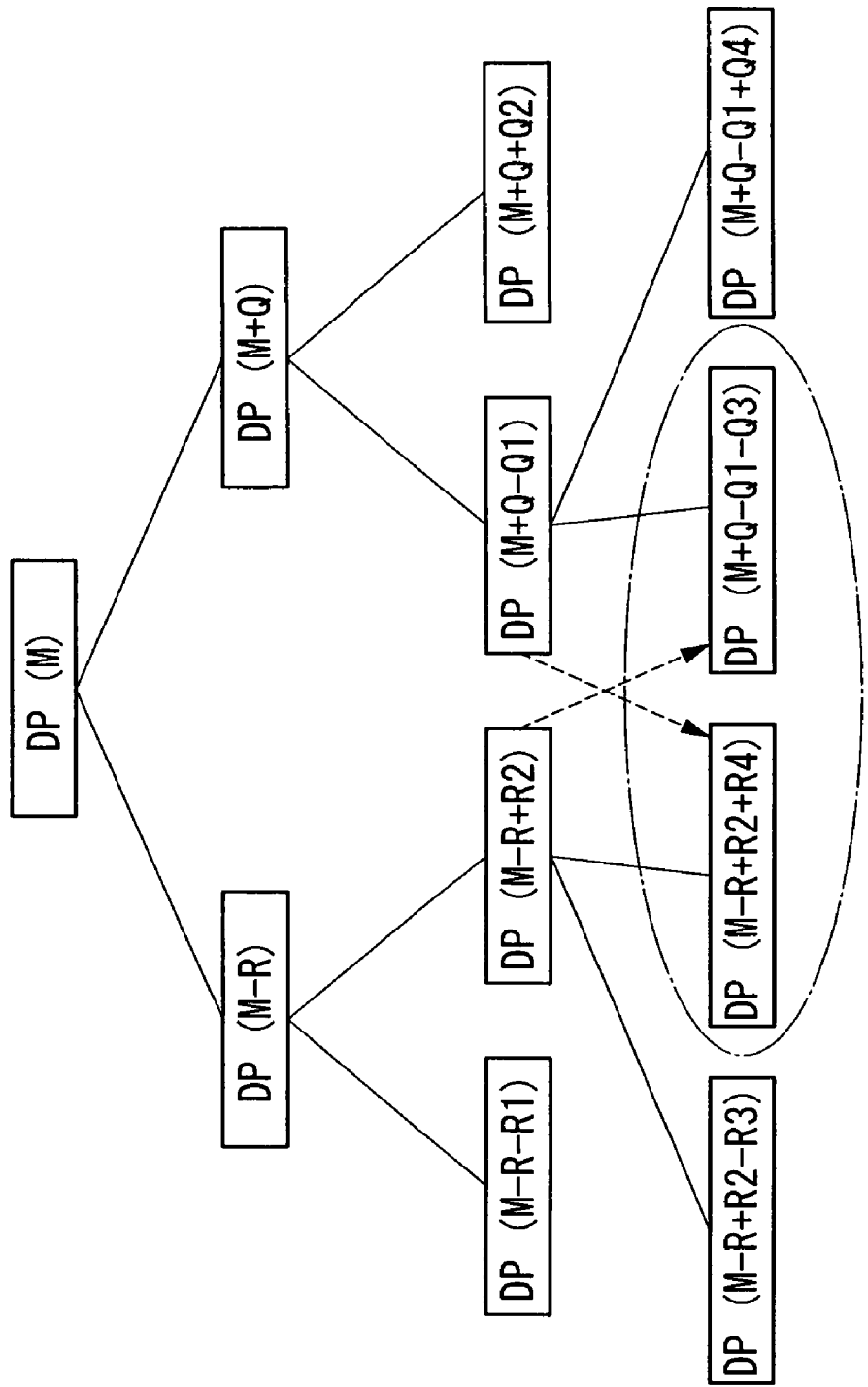
FIG. 10 is a conceptual view schematically showing how dot arrangements with different dot numbers are sequentially determined.

The same process as above further advances from the calculation results shown in FIG. 9, and the dot arrangements DP (M−R+R2−R3), DP (M−R+R2+R4), DP (M+Q−Q1−Q3), and DP (M+Q−Q1+Q4) are determined as shown in FIG. 10. When, for example, R4 dots are added and DP (M−R+R2+R4) is determined from DP (M−R+R2), DP (M−R+R2) is the initial arrangement Ds, and DP (M+Q−Q1) is the reference dot arrangement Dr. Also, when Q3 dots are subtracted and DP (M+Q−Q1−Q3) is determined from DP (M+Q−Q1), DP (M+Q−Q1) is the initial arrangement Ds, and DP (M−R+R2) is the reference dot arrangement Dr.

Thus, a function in which a dot arrangement with a large number of dots always encompasses a dot arrangement with a smaller number of dots is maintained and the dot arrangement for each dot number is determined by repeating the process described above.

Ultimately, it is possible to determine the dot arrangement for each dot number wherein the number of dots that are ON increases in increments of one from the minimum dot number (1) to the maximum dot number (I×J). In other words, in the processes in Procedure 2 and Procedure 3 described above, the original dot arrangement is used as a reference to determine the pixel positions in the dot arrangement where the dots are ON or OFF, and it is therefore ensured that the dot ON positions will differ by one in comparison with a dot arrangement in which the number of dots that are ON is different by one.

Thus, a threshold matrix can be created on the basis of the dot arrangement for each dot number wherein the number of dots that are ON is increased in increments of one from the minimum dot number (1) to the maximum dot number (I×J), by sequentially assigning (increasing in increments of one) the thresholds to the dot positions in which the dots are newly switched ON. The pixel numbers I, J can be set according to the pixel size in the threshold matrix to be determined.

Next, the flowchart in FIG. 7 will be described. FIG. 7 is a flowchart showing the procedure of determining the dot arrangement for a case in which the dots are increased from the reference dot arrangement. Steps that are identical or similar to those in the flowchart in FIG. 1 are denoted by the same reference numerals, and descriptions thereof are omitted.

In the flowchart shown in FIG. 7, step S110 through step S118 in the flowchart in FIG. 1 are replaced with step S110A through step S118A in FIG. 7.

In step S110A, the initial value of the dot arrangement D (in this case, the initial arrangement Ds described in FIGS. 9 and 10) is set, and the reference dot arrangement Dr is also set. An N number of dots are switched to dot ON from the dot OFF positions in the dot arrangement Ds and the dot ON positions in the dot arrangement Dr.

More specifically, the following relation is obtained when a comparison is drawn between the "dot number for the initial value Ds," the "dot number being determined" (the dot number at which the dot arrangement is to be determined), and the dot number for the reference dot arrangement Dr:

(Ds dot number)<(Dot number to be determined)<(Dr dot number); and    (Relation 1)

and the following relation holds true:

(Dot number to be determined)=(Ds dot number)+N.    (Relation 2)

When a selection is made between P1 and P2 in step S118A in FIG. 7, a dot ON position P1 is randomly selected and a dot OFF position P2 is randomly selected from a dot arrangement in which the dot arrangement Ds is dot OFF and the dot arrangement Dr is dot ON. The subsequent process is as described in FIG. 1.

Thus, placing restrictions on the dot positions in which dots can be switched ON and performing a calculation makes it possible to obtain dot arrangements such as those in which an inclusive relation can be ensured for dot arrangements obtained by varying the dot numbers both in the initial arrangement Ds and in the reference arrangement Dr.

FIG. 8 is a flowchart showing the procedure of determining the dot arrangement for a case in which the dots are decreased from the reference dot arrangement. Steps that are identical or similar to those in the flowchart in FIG. 1 are denoted by the same reference numerals, and descriptions thereof are omitted.

In the flowchart shown in FIG. 8, step S110 through step S118 in the flowchart in FIG. 1 are replaced with step S110B through step S118B in FIG. 8.

In step S110B, the initial value of the dot arrangement D (in this case, the initial arrangement Ds described in FIGS. 9 and 10) is set, and the reference dot arrangement Dr is also set. An N number of dots are switched to dot OFF from the dot ON positions in the dot arrangement Ds and the dot OFF positions in the dot arrangement Dr.

More specifically, the following relation is obtained when a comparison is drawn between the "dot number for the initial value Ds," the "dot number being determined" (the dot number at which the dot arrangement is to be determined), and the dot number for the reference dot arrangement Dr:

(Dr dot number)<(Dot number to be determined)<(Ds dot number); and    (Relation 3)

(Dot number to be determined)=(Ds dot number)−N.    (Relation 4)

When a selection is made between P1 and P2 in step S118B in FIG. 8, a dot ON position P1 is randomly selected and a dot OFF position P2 is randomly selected from a dot arrangement in which the dot arrangement Ds is dot ON and the dot arrangement Dr is dot OFF. The subsequent process is as described in FIG. 1.

Thus, placing restrictions on the dot positions in which dots can be switched OFF and performing a calculation makes it possible to determine dot arrangements such as those in which an inclusive relation can be ensured for dot arrangements obtained by varying the dot numbers both in both the initial arrangement Ds and in the reference arrangement Dr.

According to the method described above, ultimately, dot arrangements are determined for each dot number obtained by increasing the number of dots in the dot ON state by increments of one, and a threshold matrix is created from the dot arrangement for each dot number.

Next, the procedure for calculating the threshold matrix will be described.

First, the method for determining the sequence for calculating the threshold matrix (specifically, the order of dot numbers in which the calculation for determining the dot arrangement is executed) will be described. More specifically, a sequence (ordered set R) is created in which the dot numbers are aligned in the order in which the calculation is executed.

For example, if the order of calculating (determining) the dot arrangement in FIG. 10 is dot number M→(M+Q)→(M−

R)→(M+Q+Q2)→, then the ordered set R is expressed as sequence in which the dot numbers are aligned in order {M, M+Q, M−R, M+Q+Q2, . . . }.

An example of the method for determining the sequence in which the threshold matrices are determined will now be described with reference to FIGS. 11A to 11F. According to the sequence-determining principle, the dot number at which a nozzle ejection failure has the greatest effect is set as the first element, and a dot number increased by a number of dots that ensures the next constant degree of freedom (the degree of freedom for determining the dot arrangement) is then set as the second element, as shown in FIG. 11A.

Figure 11:
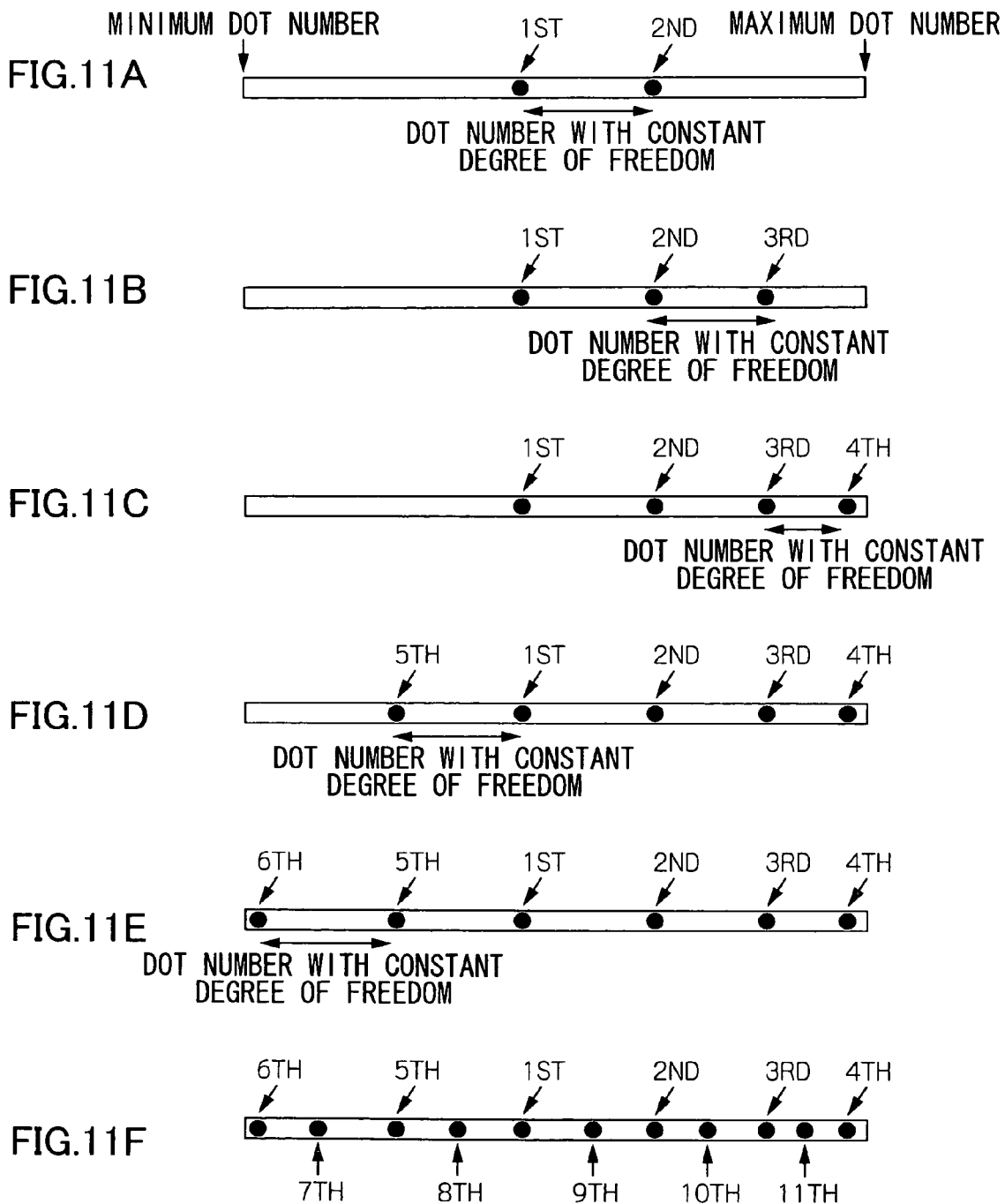
FIGS. 11A to 11F are explanatory diagrams used to describe an example of a sequential determination method for a case in which the threshold matrix is determined.

Next, a dot number that is further increased by a number of dots that ensures an additional fixed degree of freedom (the degree of freedom for determining the dot arrangement) in the direction in which the dot number increases is set as the third element (FIG. 11B).

The dot number is increased in the same manner (FIG. 11C). When the dot number reaches the maximum dot number, the dots are then decreased in the direction of reducing the dot number from the first (initial) dot number.

More specifically, as shown in FIG. 11D, a dot number that is reduced by a number of dots that ensures a constant degree of freedom (the degree of freedom for determining the dot arrangement) in relation to the first dot number is set as the next element (fifth element in this case). The next element is a dot number reduced by a number of dots that ensures an additional constant degree of freedom (the degree of freedom for determining the dot arrangement) in the direction in which the dot number is reduced (FIG. 11E). Similarly, when the dot number is decreased and the minimum dot number is reached, the dot numbers already shown in the sequence are temporarily aligned in the direction of increase of the dot numbers, and the dot numbers near the middle of the scattered dot numbers continue to be added one after another to the sequence (FIG. 11F).

After this process (FIG. 11F) is completed, the dot numbers already shown in the sequence are once again temporarily aligned in the direction of increase of the dot numbers, and the dot numbers near the middle of these scattered dot numbers continue to be added one after another to the sequence. This operation is repeated until all dot numbers have been selected (from the minimum dot number to the maximum dot number).

Thus, the dot arrangement is calculated in the order of the resulting ordered set R.

Figure 12:
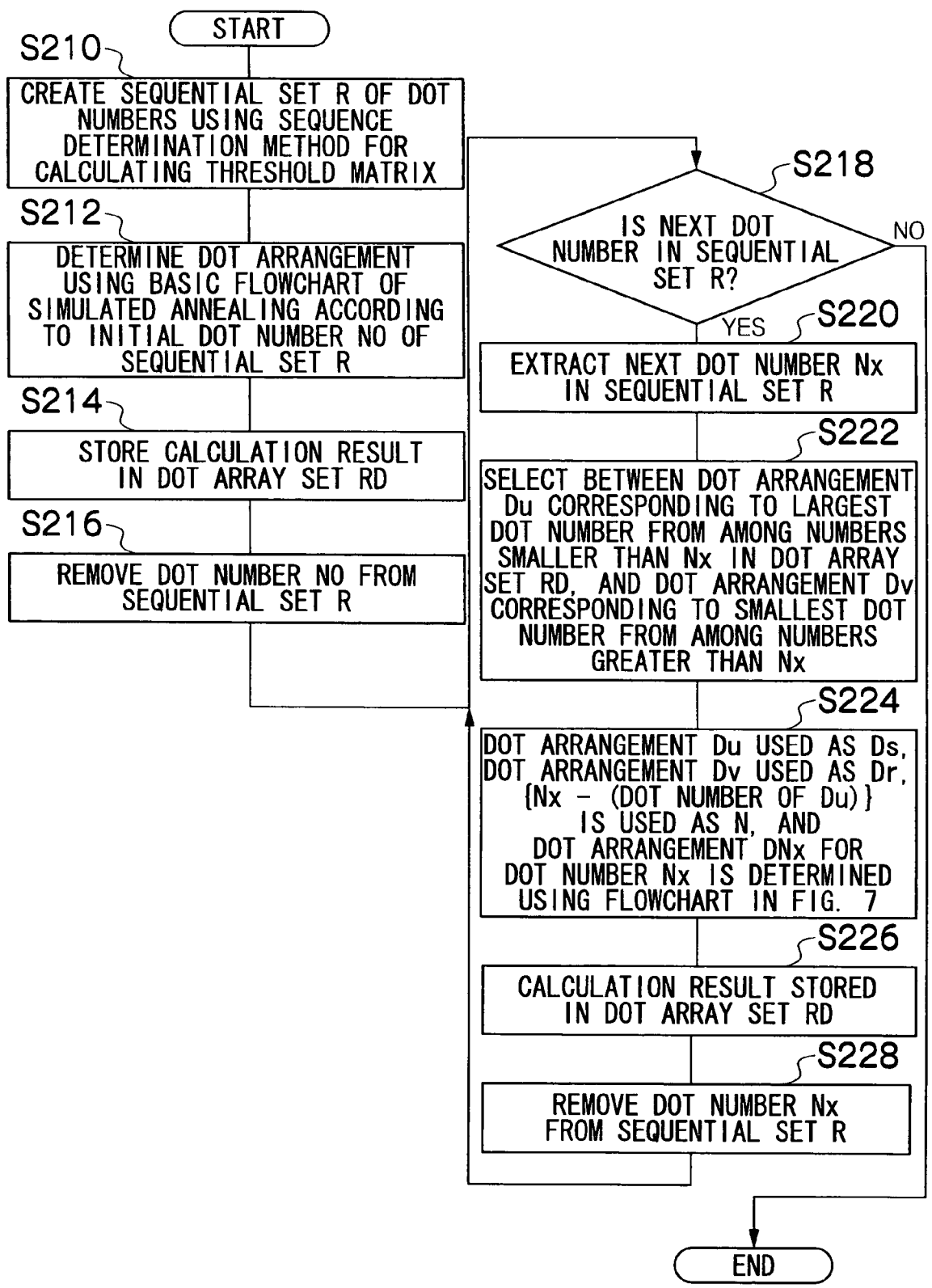
FIG. 12 is a flowchart showing the procedure of calculating the threshold matrix.

FIG. 12 is a flowchart showing the sequence of calculating the threshold matrix. As shown in this diagram, first, a sequential set R of dot numbers is created using the sequence determination method (for example, the method shown in FIGS. 11A to 11F) for calculating the threshold matrix (step S210 in FIG. 12).

Next, the dot arrangement is determined using the basic flowchart of simulated annealing (described in FIG. 1) on the basis of the initial dot number N0 of the sequential set R (step S212 in FIG. 12). The calculation result (in other words, the determined dot arrangement of the dot number N0) is then stored in a dot array set RD (step S214).

Thus, the dot number N0 upon completion of the calculation after the dot arrangement is determined is removed from the ordered set R (step S216). It is then determined whether the next dot number (the dot number at which the dot arrangement is to be determined) remains in the ordered set R (step S218), and if the number does remain (if the result is YES), the next dot number Nx is extracted from the ordered set R (step S220).

Next, a selection is made between a dot arrangement Du corresponding to the largest dot number from among the numbers smaller than Nx in the dot array set RD, and a dot arrangement Dv corresponding to the smallest dot number from among the numbers greater than Nx (step S222). At this time, if there are no dot numbers smaller than Nx, the dot arrangement with a dot number corresponding to zero (in other words, all dots are OFF) is set to Du. Also, if there are no dot numbers greater than Nx, a dot arrangement in which all dots are ON is set to Du.

Next, the process advances to step S224. In step S224, the dot arrangement Du selected in step S222 is used as "Ds," the dot arrangement Dv is used as "Dr," {Nx−(dot number of dot arrangement Du)} is used as N, and the dot arrangement DNx for the dot number Nx is determined using the flowchart described in FIG. 7.

In step S224, the following step replacements can be made. More specifically, the dot arrangement Du is used as "Dr," the dot arrangement Dv is used as "Ds," {(dot number of dot arrangement Dv)−Nx} is used as N, and the dot arrangement DNx for the dot number Nx is determined using the flowchart described in FIG. 8.

The calculation result in step S224 (the determined dot arrangement of the dot number Nx) is stored in the dot array set RD (step S226), and the calculated dot number Nx is removed from the ordered set R (step S228).

After step S228, the process returns to step S218. Steps in S218 through S228 are repeated until the dot arrangements are determined for all the dot numbers in the ordered set R. When the dot arrangements are determined for all the dot numbers, and when all elements (dot numbers) are removed from the ordered set R, the result in step S218 is NO and the process is complete.

The threshold matrix is created by aligning the elements (dot arrangements) of the dot array set RD thus obtained and sequentially (increasing in increments of one) assigning the thresholds to the dot positions in which the dots are newly switched ON.

The dot determination method and the method for creating a threshold matrix described above can be executed using a computer.

More specifically, a computer can be made to function as the dot arrangement determination apparatus as well as the threshold matrix creating apparatus by creating a program (processing program for determining dot arrangements or program for creating threshold matrices) that executes algorithms of the dot arrangement determination method and the threshold matrix creating method described above on a computer, and operating the computer with this program.

Figure 13:
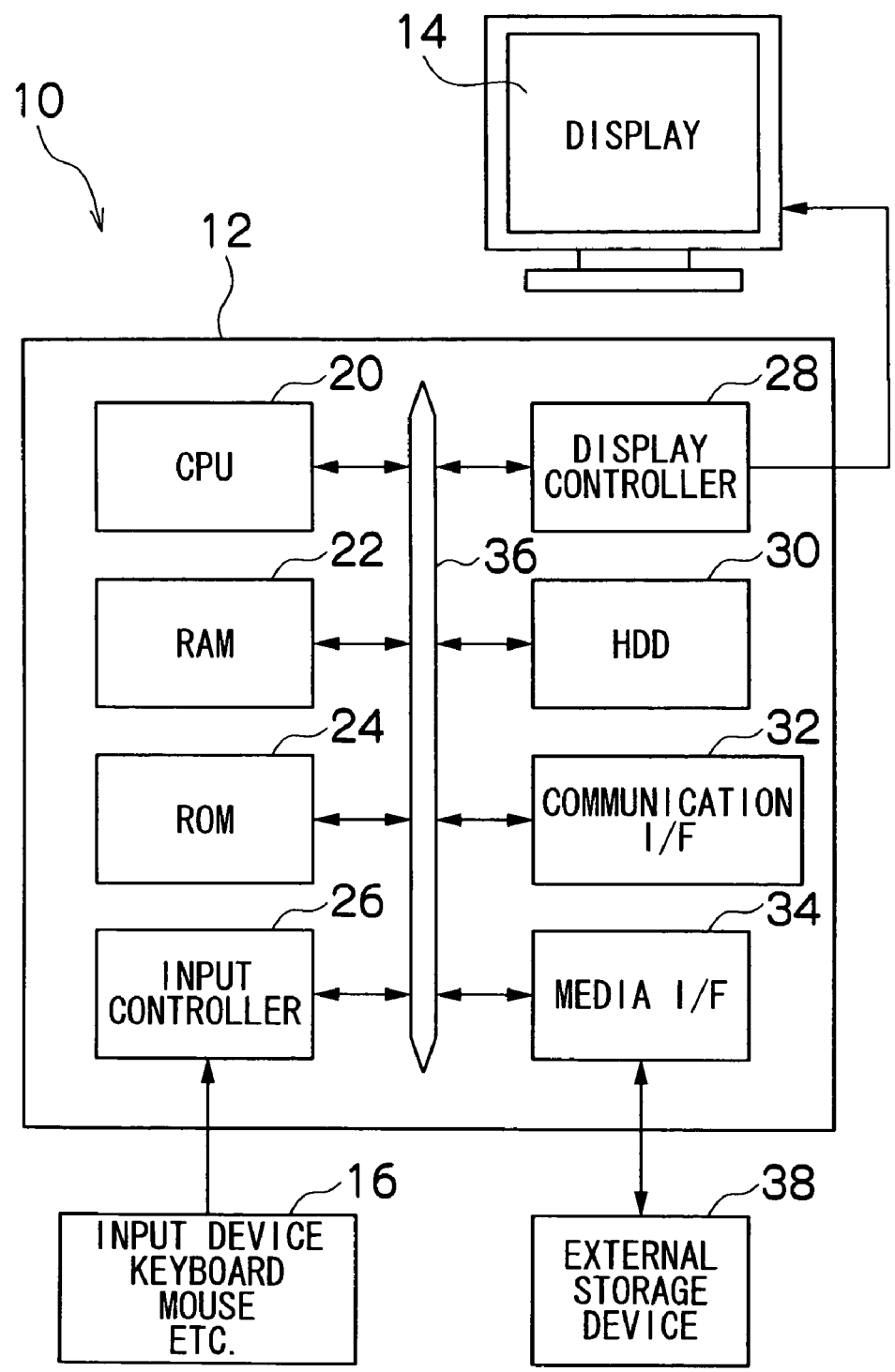
FIG. 13 is a block diagram showing an example of the system configuration of a computer that performs the dot arrangement determination process and the threshold matrix creating process according to the embodiment of the present invention.

FIG. 13 is a block diagram showing a structural example of a computer system. A computer 10 is configured from a main body 12, a display (display device) 14, and a keyboard, mouse, or another such input device (input device for inputting various commands) 16. The interior of the main body 12 contains a central processing unit (CPU) 20, a RAM 22, a ROM 24, an input controller 26 for controlling signal inputs from the input device 16, a display controller 28 for outputting display signals to the display 14, a hard disk device 30, a communication interface 32, and a media interface 34; and these circuits are all connected to each other via a bus 36.

The CPU 20 functions as a complete control unit and calculation unit (calculation means). The RAM 22 is used as a temporary data storage region and the region of operation when the program is run by the CPU 20. The ROM 24 is a rewritable nonvolatile storage device that stores the boot program for running the CPU 20, various set values, and network connectivity information. The hard disk device 30 stores the operating system (OS), various application software (programs), and data.

The communication interface 32 is a device for connecting external devices and communication networks in accordance with a USB, LAN, Bluetooth, or other such specific communication formats. The media interface 34 is a device for controlling the reading and writing of an external storage device 38, which is typified by a memory card, a magnetic disk, a magneto-optical disk, or an optical disk.

The processing program for determining dot arrangements and the program for creating threshold matrices according to the embodiment of the present invention are stored in the hard disk device 30 or the external storage device 38, and the programs are read out as necessary and are executed by the RAM 22. It is also possible that a program be provided by a server installed on a network (not shown) connected via the communication interface 32, and another possibility is to provide a calculation processing service from a main program by a server on the Internet.

The operator can input the settings of the desired matrix size and the initial values (dot number for starting the calculation, initial temperature, etc.) by operating the input device 16 while viewing an application window (not shown) displayed on the display 14, and can confirm the calculation results on the display 14.

Described below is an example of an inkjet recording apparatus to which the threshold matrix created by the threshold matrix creating method described above is applied.

Entire Configuration of Inkjet Recording Apparatus

Figure 14:
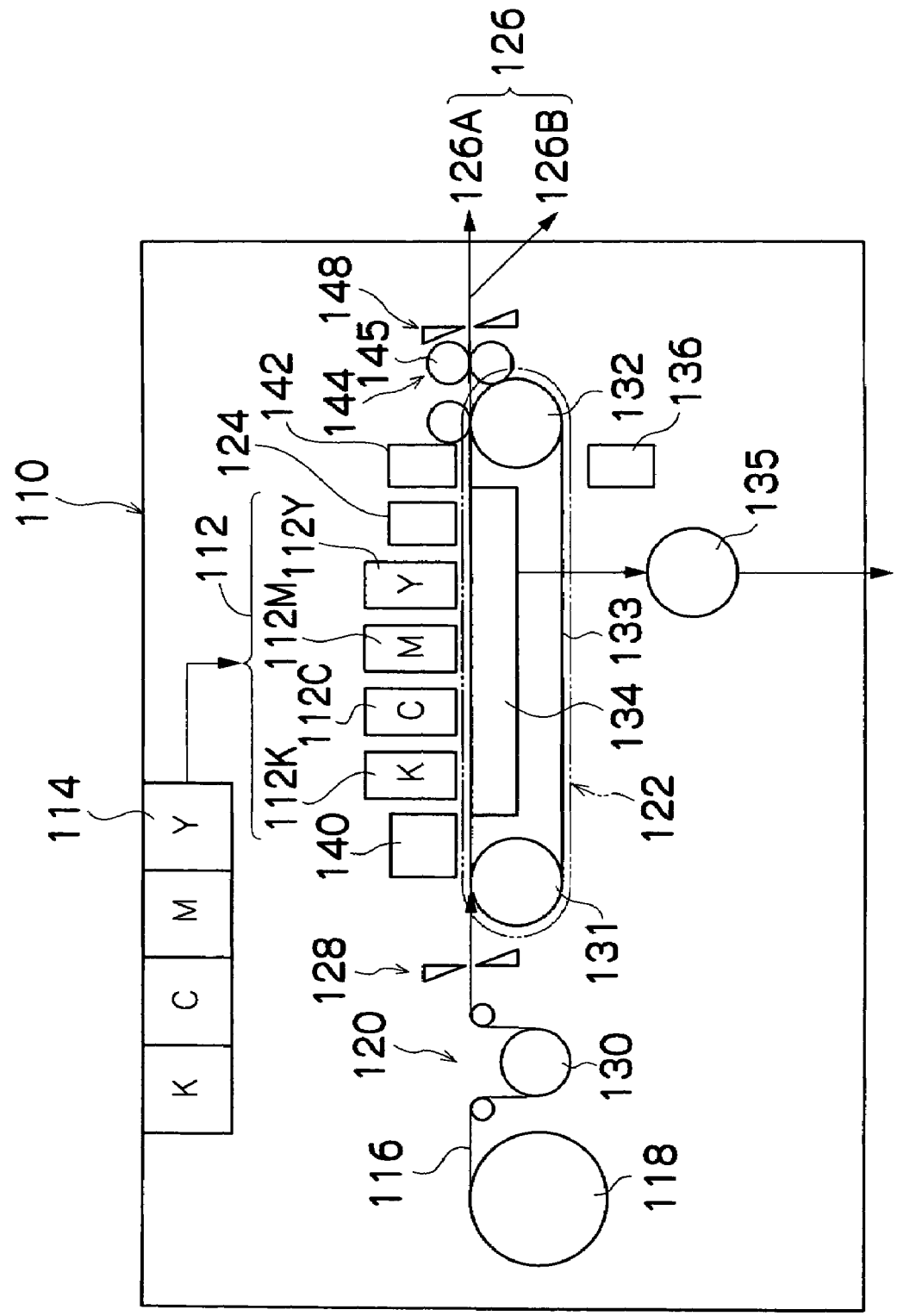
FIG. 14 is a general structural view of an inkjet recording apparatus that depicts one embodiment of the image forming apparatus according to the present invention.

FIG. 14 is a general structural view of an inkjet recording apparatus showing the first embodiment of the image forming apparatus according to the present invention. As shown in this diagram, this inkjet recording apparatus 110 comprises a print unit 112 having a plurality of inkjet recording heads (hereinafter referred to as heads) 112K, 112C, 112M, and 112Y for ink colors of black (K), cyan (C), magenta (M), and yellow (Y); an ink storing/loading unit 114 that stores the ink supplied to the heads 112K, 112C, 112M, and 112Y; a paper supply unit 118 for supplying recording paper 116 to be the recording medium; a decurling unit 120 for removing curling from the recording paper 116; a belt conveyer unit 122 that is disposed facing the nozzle surface (ink ejection surface) of the print unit 112 for conveying recording paper 116 while maintaining the flatness of the recording paper 116; a print determination unit 124 for reading the printing results from the print unit 112; and a paper ejection unit 126 for ejecting the recording paper (object of printing) after printing to the exterior.

The ink storing and loading unit 114 has ink tanks for storing the inks of K, C, M and Y to be supplied to the heads 112K, 112C, 112M, and 112Y, and the tanks are connected to the heads 112K, 112C, 112M, and 112Y by means of prescribed channels. The ink storing and loading unit 114 has a warning device (for example, a display device or an alarm sound generator) for warning when the remaining amount of any ink is low, and has a mechanism for preventing loading errors among the colors.

In FIG. 14, a magazine for rolled paper (continuous paper) is shown as an example of the paper supply unit 118; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording medium (medium) can be used, it is preferable that an information recording medium such as a bar code and a wireless tag containing information about the type of medium is attached to the magazine, and by reading the information contained in the information recording medium with a predetermined reading device, the type of recording medium to be used (type of medium) is automatically determined, and ink-droplet ejection is controlled so that the ink-droplets are ejected in an appropriate manner in accordance with the type of medium.

The recording paper 116 delivered from the paper supply unit 118 retains curl due to having been loaded in the magazine. In order to remove the curl, heat is applied to the recording paper 116 in the decurling unit 120 by a heating drum 130 in the direction opposite from the curl direction in the magazine. The heating temperature at this time is preferably controlled so that the recording paper 116 has a curl in which the surface on which the print is to be made is slightly round outward.

In the case of an apparatus configuration that uses rolled paper, as shown in FIG. 14, a cutter (first cutter) 128 is provided for cutting, and the rolled paper is cut to the desired size by this cutter 128. When cut paper is used, the cutter 128 is not needed.

The decurled and cut recording paper 116 is delivered to the belt conveyance unit 122. The belt conveyance unit 122 has a configuration in which an endless belt 133 is set around rollers 131 and 132 so that the portion of the endless belt 133 facing at least the nozzle face of the printing unit 112 and the sensor face of the print determination unit 124 forms a horizontal plane (flat plane).

The belt 133 has a width that is greater than the width of the recording paper 116, and a plurality of suction apertures (not shown) are formed on the belt surface. A suction chamber 134 is disposed in a position facing the sensor surface of the print determination unit 124 and the nozzle surface of the printing unit 112 on the interior side of the belt 133, which is set around the rollers 131 and 132, as shown in FIG. 14. The suction chamber 134 provides suction with a fan 135 to generate a negative pressure, and the recording paper 116 is held on the belt 133 by suction.

The belt 133 is driven in the clockwise direction in FIG. 14 by the motive force of a motor 188 (shown in FIG. 19) being transmitted to at least one of the rollers 131 and 132, which the belt 133 is set around, and the recording paper 116 held on the belt 133 is conveyed from left to right in FIG. 14.

Since ink adheres to the belt 133 when a marginless print job or the like is performed, a belt-cleaning unit 136 is disposed in a predetermined position (a suitable position outside the printing area) on the exterior side of the belt 133. Although the details of the configuration of the belt-cleaning unit 136 are not shown, examples thereof include a configuration in which the belt 133 is nipped with cleaning rollers such as a brush roller and a water absorbent roller, an air blow configuration in which clean air is blown onto the belt 133, or a combination of these. In the case of the configuration in which the belt 133 is nipped with the cleaning rollers, it is preferable to make the line velocity of the cleaning rollers different than that of the belt 133 to improve the cleaning effect.

The inkjet recording apparatus 10 can comprise a roller nip conveyance mechanism, in which the recording paper 116 is pinched and conveyed with nip rollers, instead of the belt conveyance unit 122. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 140 is disposed on the upstream side of the printing unit 112 in the conveyance pathway formed by the belt conveyance unit 122. The heating fan 140 blows heated air onto the recording paper 116 to heat the recording paper 116 immediately before printing so that the ink deposited on the recording paper 116 dries more easily.

Figure 15:
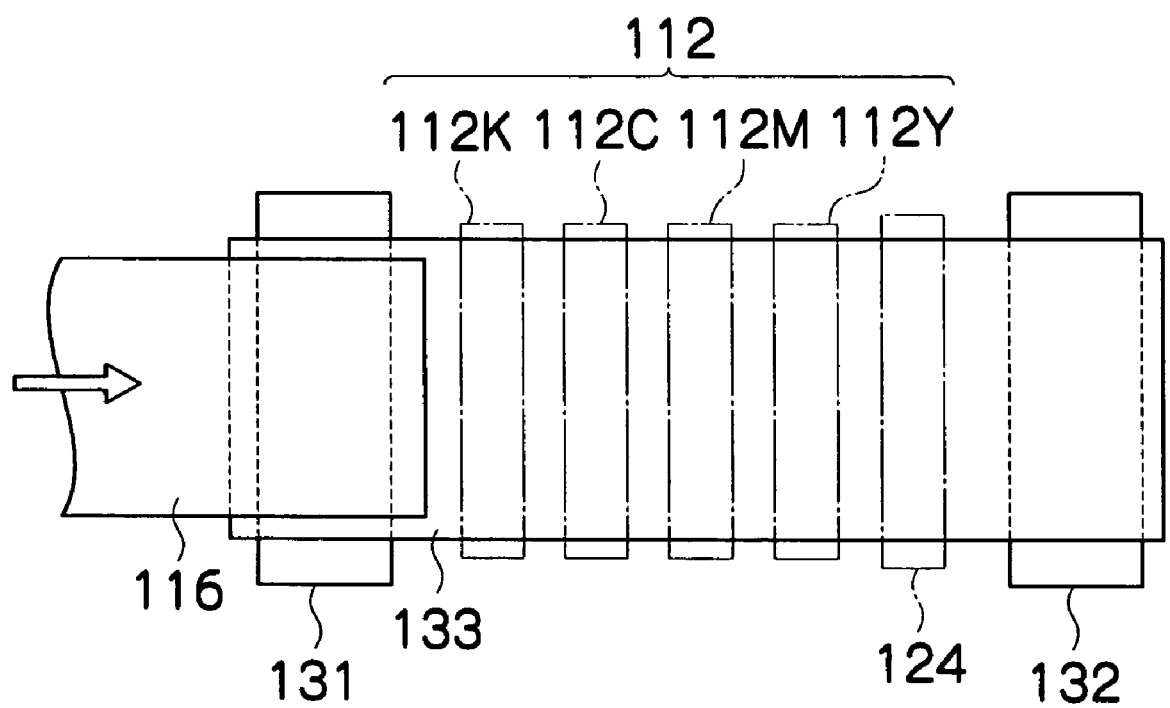
FIG. 15 is a general plan view of the periphery of the print unit in the inkjet recording apparatus shown in FIG. 14.

The heads 112K, 112C, 112M and 112Y of the printing unit 112 are full line heads having a length corresponding to the maximum width of the recording paper 116 used with the inkjet recording apparatus 10, and comprising a plurality of nozzles for ejecting ink arranged on a nozzle face through a length exceeding at least one edge of the maximum-size recording medium (namely, the full width of the printable range) (see FIG. 15).

The print heads 112K, 112C, 112M and 112Y are arranged in color order (black (K), cyan (C), magenta (M), yellow (Y)) from the upstream side in the feed direction of the recording paper 116, and these respective heads 112K, 112C, 112M and 112Y are fixed extending in a direction substantially perpendicular to the conveyance direction of the recording paper 116.

A color image can be formed on the recording paper 116 by ejecting inks of different colors from the heads 112K, 112C, 112M and 112Y, respectively, onto the recording paper 116 while the recording paper 116 is conveyed by the belt conveyance unit 122.

By adopting a configuration in which the full line heads 112K, 112C, 112M and 112Y having nozzle rows covering the full paper width are provided for the respective colors in this way, it is possible to record an image on the full surface of the recording paper 116 by performing just one operation of relatively moving the recording paper 116 and the printing unit 112 in the paper conveyance direction (the sub-scanning direction), in other words, by means of a single sub-scanning action. Higher-speed printing is thereby made possible and productivity can be improved in comparison with a shuttle type head configuration in which a recording head reciprocates in the main scanning direction.

Although the configuration with the KCMY four standard colors is described in the present embodiment, combinations of the ink colors and the number of colors are not limited to those. Light inks, dark inks or special color inks can be added as required. For example, a configuration is possible in which inkjet heads for ejecting light-colored inks such as light cyan and light magenta are added. Furthermore, there are no particular restrictions of the sequence in which the heads of respective colors are arranged.

The print determination unit 124 shown in FIG. 14 includes an image sensor (line sensor or area sensor) for imaging the droplet ejection results of the print unit 112, and functions as a device that checks for nozzle clogging, landing position misalignment, and other such ejection failures from the droplet ejection image read by the image sensor. The test pattern or actual image printed by the heads 112K, 112C, 112M, and 112Y of the respective colors is read by the print determination unit 124 to determine the ejection of the heads. This ejection determination includes determining whether they have ejected, measuring the dot size, and measuring the positions in which the dots have landed.

A post-drying unit 142 is disposed following the print determination unit 124. The post-drying unit 142 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 144 is disposed following the post-drying unit 142. The heating/pressurizing unit 144 is a device to control the glossiness of the image surface, and the image surface is pressed with a pressure roller 145 having a predetermined uneven surface shape while the image surface is heated, and the uneven shape is transferred to the image surface.

The print thus created is discharged from the paper ejection unit 126. It is preferable to separately discharge the test print and the image to be originally printed (the result of printing the target image). In this inkjet recording apparatus 110, a selection device (not shown) that switches between paper ejection routes is provided to select between the printed result of the original image and the printed result of the test print and to send them to ejection units 126A and 126B. When the original image and the test print are formed in parallel simultaneously on a large piece of paper, the portion with the test print is cut away by a cutter (second cutter) 148. Also, though not shown in FIG. 14, a sorter for collating the images in order is provided to the ejection unit 126A.

Structure of Head

Next, the structure of a head will be described. The heads 112K, 112C, 112M and 112Y of the respective ink colors have the same structure, and a reference numeral 150 is hereinafter designated to any of the heads.

Figure 16A:
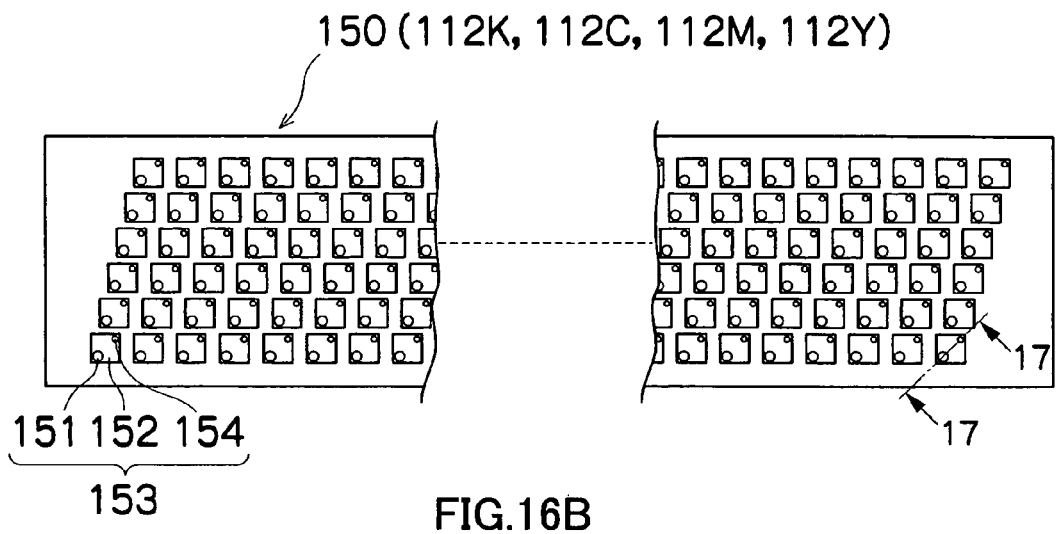
FIG. 16A is a perspective plan view showing a structural example of an inkjet recording head.
Figure 16B:
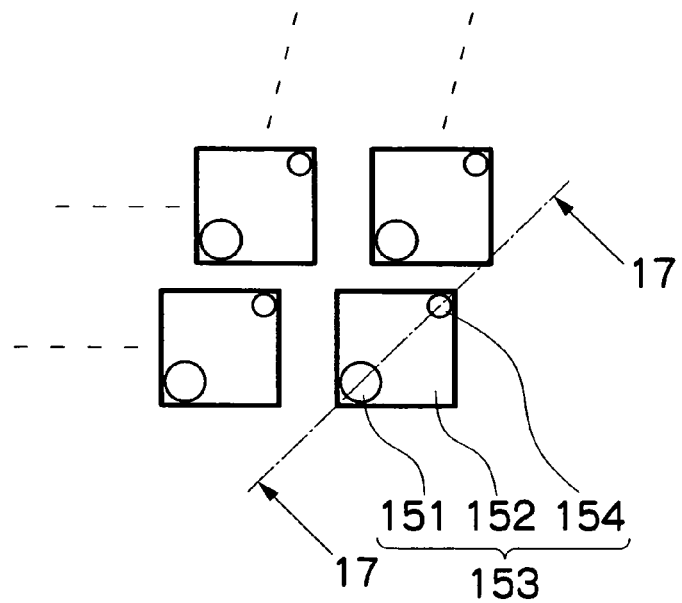
FIG. 16B is a general enlarged view of FIG. 16A.
Figure 16C:
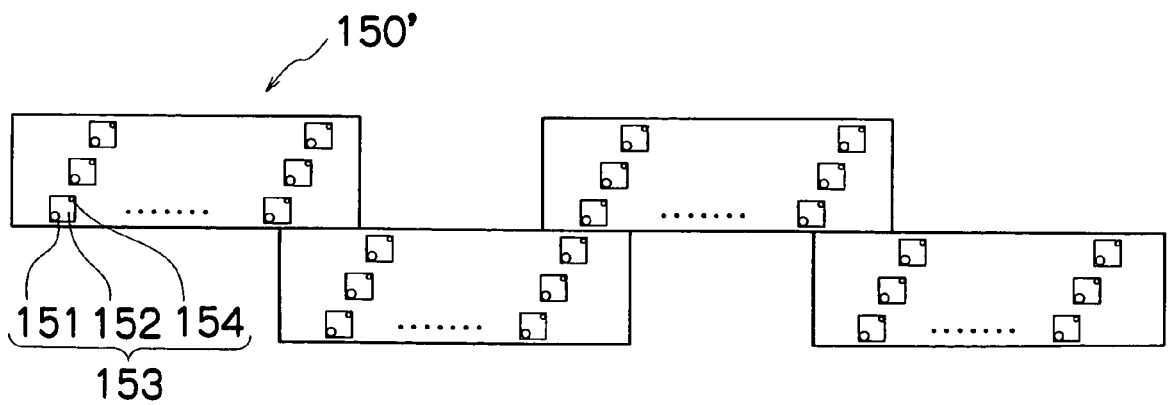
FIG. 16C is a perspective plan view showing another structural example of a full-line head.
Figure 17:
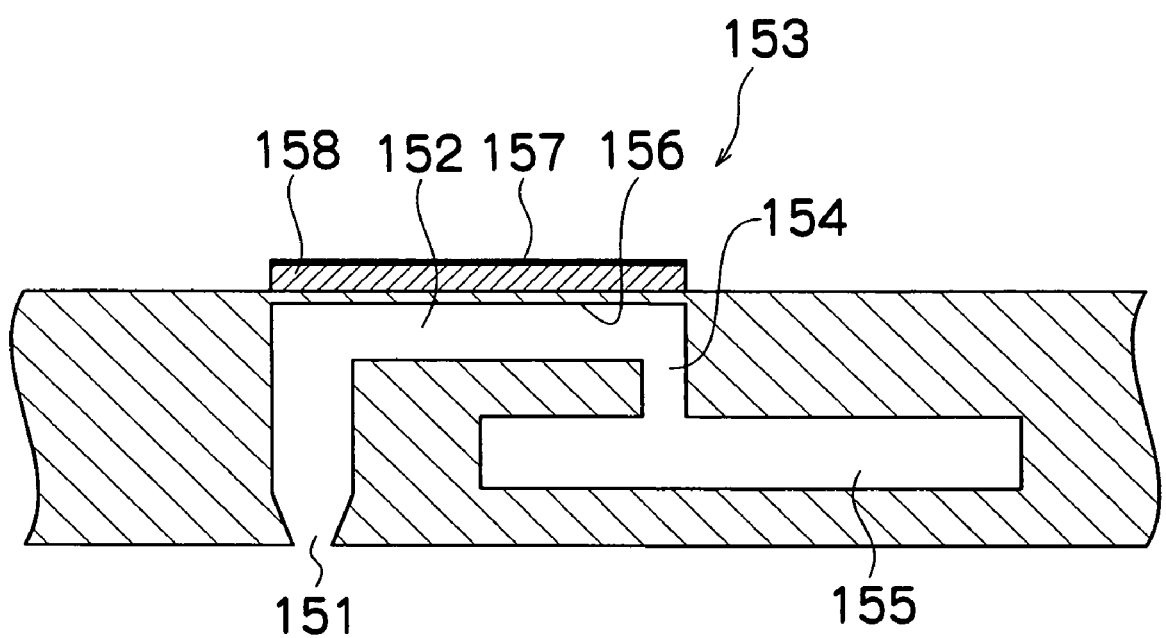
FIG. 17 is a cross-sectional view along the line 17-17 in FIG. 16A.

FIG. 16A is a perspective plan view showing an example of the configuration of the head 150, FIG. 16B is an enlarged view of a portion thereof, FIG. 16C is a perspective plan view showing another example of the configuration of the head 150, and FIG. 17 is a cross-sectional view taken along the line 17-17 in FIG. 16A, showing the inner structure of a droplet ejection element (an ink chamber unit for one nozzle 151).

The nozzle pitch in the head 150 should be minimized in order to maximize the density of the dots printed on the surface of the recording paper 116. As shown in FIGS. 16A and 16B, the head 150 according to the present embodiment has a structure in which a plurality of ink chamber units (droplet ejection elements) 153, each comprising a nozzle 151 forming an ink ejection port, a pressure chamber 152 corresponding to the nozzle 151, and the like, are disposed two-dimensionally in the form of a staggered matrix, and hence the effective nozzle interval (the projected nozzle pitch) as projected in the lengthwise direction of the head (the direction perpendicular to the paper conveyance direction) is reduced and high nozzle density is achieved.

The mode of forming one or more nozzle rows through a length corresponding to the entire width of the recording paper 116 in a direction substantially perpendicular to the conveyance direction of the recording paper 116 is not limited to the example described above. For example, instead of the configuration in FIG. 16A, as shown in FIG. 16C, a line head having nozzle rows of a length corresponding to the entire width of the recording paper 116 can be formed by arranging and combining, in a staggered matrix, short head modules 150' having a plurality of nozzles 151 arrayed in a two-dimensional fashion.

A pressure chamber 152 provided for each of the nozzles 151 has a substantially square planar shape (see FIGS. 16A and 16B), wherein an outlet hole for the nozzle 151 is provided to one corner on the diagonal, and an inlet hole (supply hole) 154 for supplying ink is provided to the other corner. The shape of the pressure chambers 152 is not limited to the present embodiment, and the planar shape can be a quadrilateral (diamond, rectangle), a pentagon, a hexagon, or another such polygon, or a circle, ellipse, or another shape.

As shown in FIG. 17, the pressure chambers 152 are communicated with a common flow channel 155 via the supply holes 154. The common flow channel 155 is communicated with an ink tank (not shown) as an ink supply source, and the ink supplied from the ink tank is distributed and supplied to the pressure chambers 152 via the common flow channel 155.

Actuators 158 equipped with individual electrodes 157 are bonded to a pressure plate (vibrating plate also used as a common electrode) 156 that constitutes one side (the ceiling in FIG. 17) of the pressure chambers 152. Applying a drive voltage between the individual electrodes 157 and the common electrode causes the actuators 158 to deform and the capacity of the pressure chambers 152 to change, and ink is ejected form the nozzles 151 due to this change in pressure. Piezoelectric elements that use lead zirconate titanate, barium titanate, or another such piezoelectric material can be suitably used for the actuators 158. After the ink is ejected, new ink is supplied from the common flow channel 155 to the pressure chambers 152 through the supply holes 154 when the displacement of the actuators 158 is reversed.

Figure 18:
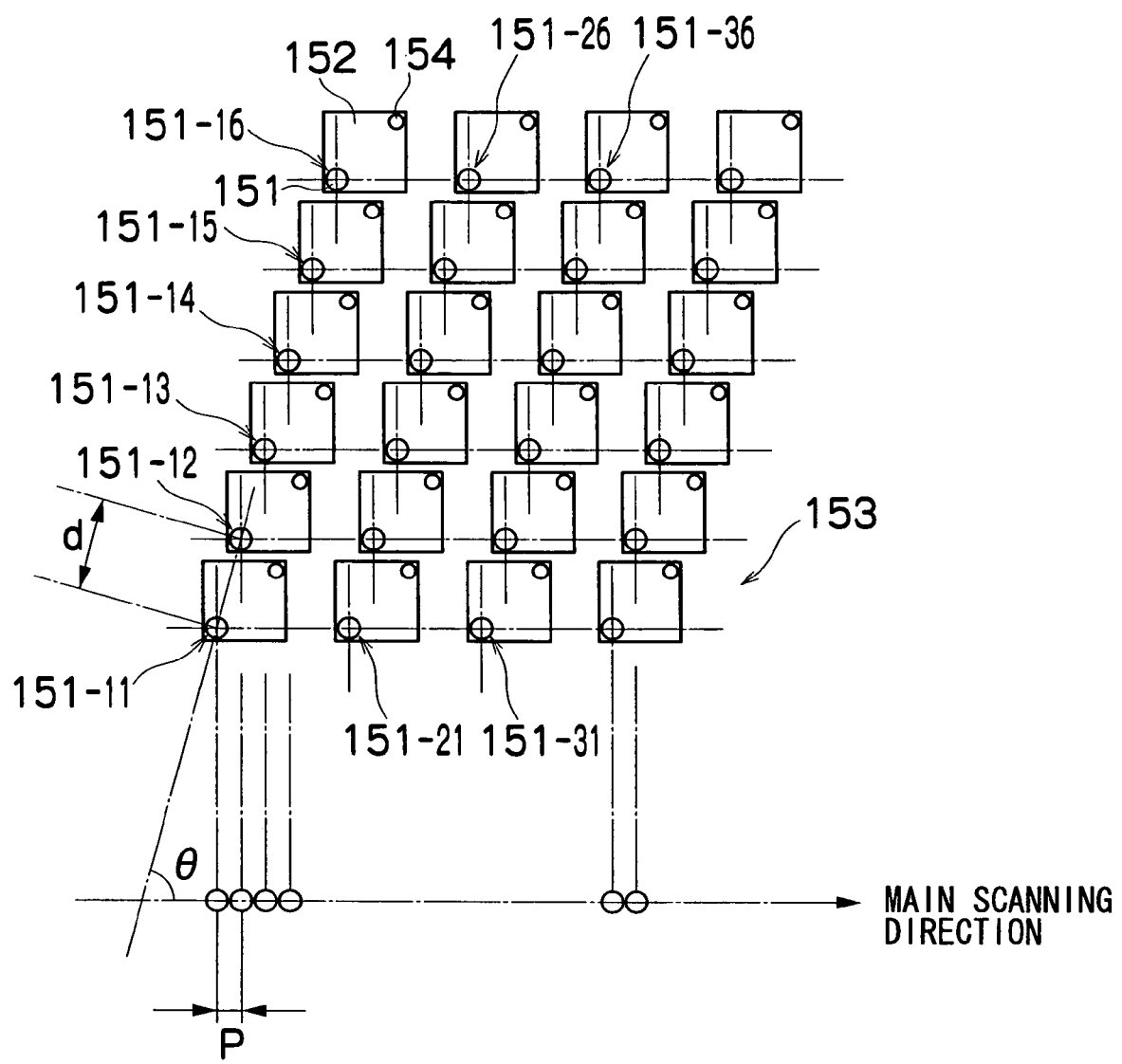
FIG. 18 is an enlarged view showing the nozzle array in the head shown in FIG. 16A.

As shown in FIG. 18, the high-density nozzle head according to the present embodiment is achieved by arranging a plurality of ink chamber units 153 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 153 are arranged at a uniform pitch d in line with a direction forming an angle of θ with respect to the main scanning direction, the pitch P of the nozzles projected so as to align in the main scanning direction is d×cos θ, and hence the nozzles 151 can be regarded to be equivalent to those arranged linearly at a fixed pitch P along the main scanning direction. Such configuration results in a nozzle structure in which the nozzle row projected in the main scanning direction has a high nozzle density of up to 2,400 nozzles per inch.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 151 arranged in a matrix such as that shown in FIG. 18 are driven, the main scanning according to the above-described (3) is preferred. More specifically, the nozzles 151-11, 151-12, 151-13, 151-14, 151-15 and 151-16 are treated as a block (additionally; the nozzles 151-21, 151-22, ..., 151-26 are treated as another block; the nozzles 151-31, 151-32, ..., 151-36 are treated as another block; ...); and one line is printed in the width direction of the recording paper 116 by sequentially driving the nozzles 151-11, 151-12, ..., 151-16 in accordance with the conveyance velocity of the recording paper 116.

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other.

The direction indicating one line recorded by the main scanning (or the longitudinal direction of the belt-shaped area) is referred to as the main scanning direction, and the direction in which sub-scanning is performed is referred to as the sub-scanning direction. More specifically, in the present embodiment, the direction in which the recording paper 116 is conveyed is the sub-scanning direction, and the direction perpendicular thereto is the main scanning direction.

The structure for arranging the nozzles in the embodiment of the present invention is not limited to the illustrated example. Also, in the present embodiment, a system has been used in which ink droplets are shot by the deformation of actuators 158 such as piezoelectric elements, but instead of a piezo jet system, various other systems can be employed, such as a thermal jet system in which the ink is heated to create air bubbles by a heater or another such heating element, and ink droplets are shot out by the pressure thereof.

Description of Control System

Figure 19:
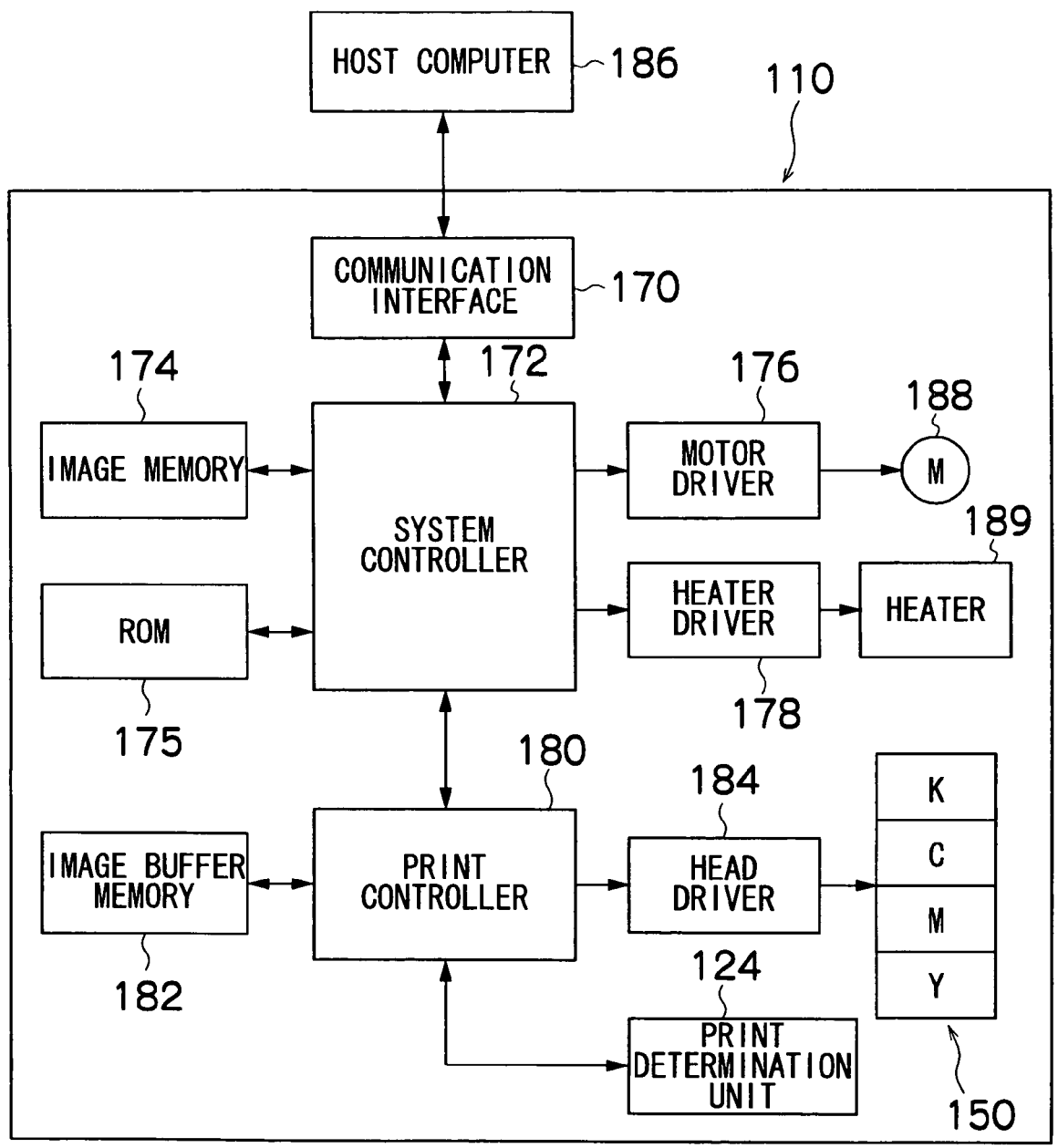
FIG. 19 is a general block view showing the system configuration of the inkjet recording apparatus according to the present embodiment.

FIG. 19 is a block diagram showing the system configuration of the inkjet recording apparatus 110. As shown in this diagram, the inkjet recording apparatus 110 has a communication interface 170, a system controller 172, an image memory 174, ROM 175, a motor driver 176, a heater driver 178, a print controller 180, an image buffer memory 182, and a head driver 184.

The communication interface 170 is an interface unit for receiving image data sent from a host computer 186. A serial interface such as USB, IEEE1394, Ethernet, wireless network, or a parallel interface such as a Centronics interface may be used as the communication interface 170. A buffer memory (not shown) may be mounted in this portion in order to increase the communication speed.

The image data sent from the host computer 186 is received by the inkjet recording apparatus 110 through the communication interface 170, and is temporarily stored in the image memory 174. The image memory 174 is a storage device for storing images inputted through the communication interface 170, and data is written and read to and from the image memory 174 through the system controller 172. The image memory 174 is not limited to a memory composed of semiconductor elements, and a hard disk drive or another magnetic medium may be used.

The system controller 172 is constituted by a central processing unit (CPU) and peripheral circuits thereof, and the like, and it functions as a control device for controlling the whole of the inkjet recording apparatus 110 in accordance with a prescribed program, as well as a calculation device for performing various calculations. More specifically, the system controller 172 controls the various sections, such as the communication interface 170, image memory 174, motor driver 176, heater driver 178, and the like, as well as controlling communications with the host computer 186 and writing and reading to and from the image memory 174 and ROM 175, and it also generates control signals for controlling the motor 188 and heater 189 of the conveyance system.

The program executed by the CPU of the system controller 172 and the various types of data which are required for control procedures are stored in the ROM 175. The ROM 175 may be a non-writeable storage device, or it may be a rewriteable storage device, such as an EEPROM. The image memory 174 is used as a temporary storage region for the image data, and it is also used as a program development region and a calculation work region for the CPU.

The motor driver (drive circuit) 176 drives the motor 188 of the conveyance system in accordance with commands from the system controller 172. The heater driver (drive circuit) 178 drives the heater 189 of the post-drying unit 142 or the like in accordance with commands from the system controller 172.

The print controller 180 has a signal processing function for performing various tasks, compensations, and other types of processing for generating print control signals from the image data stored in the image memory 174 in accordance with commands from the system controller 172 so as to supply the generated print data (dot data) to the head driver 184.

The print controller 180 is provided with the image buffer memory 182; and image data, parameters, and other such data are temporarily stored in the image buffer memory 182 during image data processing in the print controller 180. FIG. 19 shows the image buffer memory 182 as being attached to the print controller 180, but it can also be used as the image memory 174. An aspect is also possible in which a single processor is obtained by integrating the print controller 180 and the system controller 172.

To summarize the process from image input to the print output, the data of the image to be printed is inputted from the exterior via the communication interface 170 and is stored in the image memory 174. In this step, for example, RGB image data is stored in the image memory 174.

In the inkjet recording apparatus 110, an image that appears to have a pseudo continual gradation is formed by changing the deposition density or the dot size of minute dots formed by the ink (color material), and the gradation of the inputted digital image (light and shade of the image) must therefore be converted to a dot pattern that can be recreated with as much accuracy as possible. Therefore, the data for the original image (RGB) stored in the image memory 174 is sent to the print controller 180 via the system controller 172, and is converted to dot data for each ink color by a halftoning process that uses a threshold matrix in the print controller 180.

More specifically, the print controller 180 performs a process for converting the inputted RGB image data into dot data for the four colors K, C, M, and Y. The threshold matrix created by applying the present invention is incorporated into the print controller 180 and is used in the process of converting the original image into dot data. Thus, the dot data generated by the print controller 180 is stored in the image buffer memory 182.

The head driver 184 outputs a drive signal for driving the actuators 158 corresponding to the nozzles 151 of the heads 150 on the basis of the print data sent from the print controller 180 (specifically, the dot data stored in the image buffer memory 182). The head driver 184 may include a feedback control system for keeping the driving conditions of the head constant.

Ink is ejected from the corresponding nozzles 151 as a result of the drive signal outputted from the head driver 184 being sent to the heads 150. The image is formed on the recording paper 116 by controlling the ejection of ink from the heads 150 in synchronization with the rate at which the recording paper 116 is conveyed.

As described above, the amount of ink droplets ejected from the nozzles and the timing of the ejection are controlled via the head driver 184 on the basis of the dot data generated by specific signal processing in the print controller 180. The desired dot size and dot arrangement are thereby achieved.

As described in FIG. 14, the print determination unit 124 is a block that includes an image sensor, which reads the image printed on the recording paper 116, determines the printing conditions (the presence or absence of ejection, nonuniformities in droplet deposition, optical density) by specific signal processing, and provides the determination results to the print controller 180. Another ejection determination device (equivalent to the ejection abnormality determination device) may be provided either instead of or together with the print determination unit 124.

Additional possibilities for the ejection determination device include an example in which pressure sensors are provided either in or near the pressure chambers 152 of the heads 150, and ejection abnormalities are determined from a determination signal obtained from the pressure sensor when the actuators are driven for ejecting ink or measuring pressure (internal determination method); and an example in which an optical determination system composed of a laser emitting element or another such light source and a light receiving element is used, the droplets ejected from the nozzles are irradiated with laser light or other such light, and the airborne droplets are determined by the amount of transmitted light (amount of received light) (external determination method).

The print controller 180 corrects the heads 150 on the basis of information obtained from the print determination unit 124 or another ejection determination device (not shown) as necessary, and controls the execution of preliminary ejection, suction, wiping, or other such cleaning operations (nozzle restoring operations) as necessary. These cleaning operations will be further described later.

With the inkjet recording apparatus 110 thus configured, a satisfactory image with little degradation in image quality due to dot gaps can be obtained even when nozzle ejection failures occur.

In the embodiment described above, an inkjet recording apparatus that uses a full-line print head has been described, but the range of application of the present invention is not limited thereto. For example, as shown in FIGS. 20A and 20B, the present invention can also be applied to cases in which images are formed with multiple scans using a line head (hereinafter referred to as print head 250) with a length less than the width Wm of the recording medium (recording paper 116 or another printing medium) 216.

The two-way arrow 250A drawn inside the print head 250 in FIGS. 20A and 20B schematically indicates the direction of nozzle alignment and the length of the nozzle row, and the white arrow 252 indicates the print head moving direction. FIG. 20A shows the first scanning, and FIG. 20B shows the Nth scanning (N is an integer of 2 or greater) executed after changing the scanning position.

As shown in FIGS. 20A and 20B, the print head 250 is disposed with the longitudinal direction (direction of nozzle alignment) thereof running along the width direction of the recording medium 216, and is supported to be capable of moving in the print head moving direction (the direction of the hollow arrow 252) and the width direction of the recording medium 216 (the horizontal direction in FIGS. 20A and 20B) by a head moving device (not shown) (including a carriage, running guide, or other such support mechanism, and a motor or another such drive device for driving the mechanism).

An image is formed on the recording medium 216 by scanning multiple times in the print head moving direction 252 while changing the position (scanning position) of the print head 250 in relation to the width direction of the recording medium 216.

Examples of movement of the print head 250 will now be described, wherein the print head 250 can be moved to scan the recording medium 216, the recording medium 216 can be moved, or scanning can be performed by moving both the print head 250 and the recording medium 216.

As shown in FIGS. 20A and 20B, in each scan cycle, the print head 250 scans different positions, but the nozzles that have been moved over the recording medium 216 in relative fashion by these scan cycles are considered to be nozzles at the corresponding positions over the line head 255 with a hypothetical recording medium width (Wm) as shown in FIG. 21, whereby the print head 250 can be considered as part of a hypothetical line head 255 that has a nozzle row 255A with a length corresponding to the width Wm of the recording medium 216. More specifically, the present invention can also be applied to this hypothetical line head (full-line head) 255, similar to the embodiment of the full-line head 150 already described.

Figures 22A, 22B:
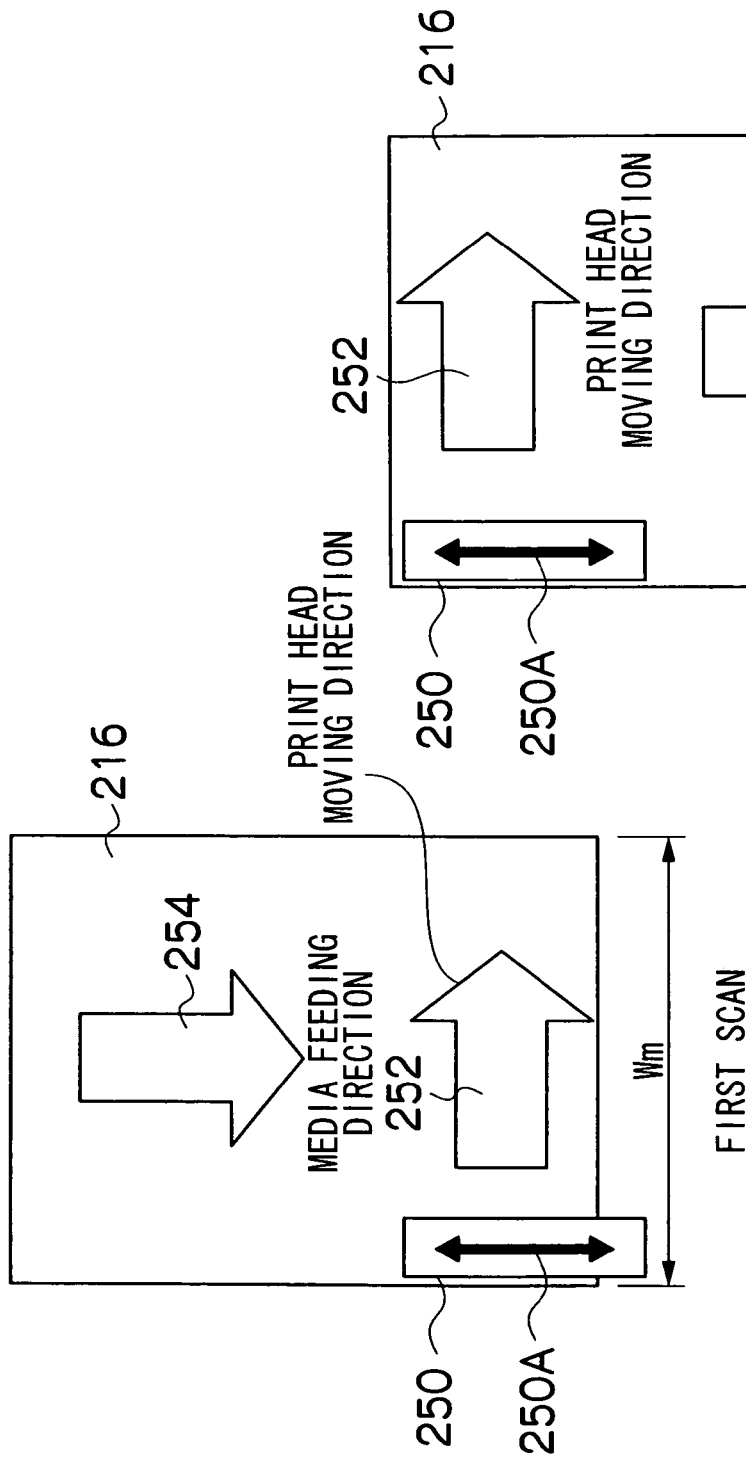
FIGS. 22A and 22B are schematic views showing another embodiment in which images are formed using a scanning print head.

As shown in FIGS. 22A and 22B, when an image is formed by the shuttle scanning of the print head 250, it is possible to switch to a hypothetical line head, and the algorithm of the present invention can still be applied.

In FIGS. 22A and 22B, identical or similar components to those in FIGS. 20A and 20B are denoted by the same reference numerals, and descriptions thereof are omitted.

In FIGS. 22A and 22B, the print head 250 is disposed such that the longitudinal direction thereof (the direction of nozzle alignment) runs along the direction in which the recording medium 216 is fed (the media feeding direction shown by the hollow arrow 254), and the print head 250 is scanning in a direction substantially perpendicular to the media feeding direction.

An image is formed on the recording medium 216 by scanning multiple times while changing the relative positions of the recording medium 216 and the print head 250 with a combination of the scanning of the print head 250 and the movement of the recording medium 216.

In the embodiments described above, an inkjet recording apparatus has been described as an example of an image recording apparatus, but the range of application of the present invention is not limited thereto. In addition to an inkjet system, the present invention can be applied to a heat transfer recording apparatus with a line head (an apparatus that has a thermal element as the image recording element), an LED electrophotographic printer and a silver salt photographic printer having an LED line exposure head (an apparatus that has a light emitting diode (LED) element as the image recording element), and other types of imaging devices.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A dot arrangement determination method performed in a signal processing device for determining an arrangement pattern to create a pseudo gradation image when m dots (where m is a natural number) corresponding to a plurality of recording elements are arranged in a specific pixel area in the pseudo gradation image, the method comprising:

a setting step of variably setting by utilizing a setting device, an arrangement pattern in which the m dots are arranged without overlapping at pixel positions in the specific pixel area;

a first image evaluation value calculating step of calculating an image evaluation value of a halftone image formed by arranging the m dots in the specific pixel area in accordance with the arrangement pattern set in the setting step in a case assumed that there is no inability to form the m dots;

a second image evaluation value calculating step of calculating an image evaluation value of a halftone image implemented according to the arrangement pattern set in the setting step in a case assumed that there is inability to form dots in an arbitrary pixel row in the specific pixel area without determining which recording element is defective; and a dot arrangement calculating step of determining the arrangement pattern with least image quality degradation for the inability to form the dots in the arbitrary pixel row in the specific pixel area by solving a combinational optimization problem by using an approximate solution method for the arrangement pattern using calculation results of the first and second image evaluation value calculating steps.

2. The dot arrangement determination method as defined in claim 1, wherein simulated annealing is used as an optimization technique for solving the combinational optimization problem by using the approximate solution method.

3. The dot arrangement determination method as defined in claim 1, wherein the image evaluation value includes a value for evaluating at least one of graininess and anisotropy.

4. The dot arrangement determination method as defined in claim 3, wherein the image evaluation value is calculated using a dot evaluation function comprising a linear combination of a graininess evaluation function and an anisotropy evaluation function.

5. The dot arrangement determination method as defined in claim 1, wherein the dot arrangement calculating step comprises a fluctuation evaluation value calculating step of calculating a fluctuation evaluation value that indicates fluctuation in the image evaluation value resulting from the inability to form the dots, based on calculation results of the first and second image evaluation value calculating steps.

6. The dot arrangement determination method as defined in claim 5, wherein the dot arrangement calculating step further comprises an evaluation value calculating step of calculating an evaluation value comprising a linear combination of the image evaluation value obtained in the first image evaluation value calculating step and the fluctuation evaluation value obtained in the fluctuation evaluation value calculating step.

7. The dot arrangement determination method as defined in claim 1, wherein:

when a dot arrangement with a larger dot number than an already determined dot arrangement is to be determined, an arrangement pattern is determined in which dots equal to a number of additional dots are newly arranged in pixel positions where no dots are arranged in the already determined dot arrangement while the already determined dot arrangement is maintained; and when a dot arrangement with a smaller dot number than the already determined dot arrangement is to be determined, an arrangement pattern is determined in which dots equal to a dot number equivalent to a difference between the dot number of the already determined dot arrangement and a dot number to be next determined are subtracted from the already determined dot arrangement.

8. A method for creating a threshold matrix, comprising:

a dot array set creating step of determining dot arrangements for all dot numbers from a smallest dot number to a largest dot number using the dot arrangement determination method as defined in claim 7, and creating a dot array set having the dot arrangements for these dot numbers as elements; and a threshold matrix creating step of creating a threshold matrix by sequentially assigning thresholds to the pixel positions in a matrix corresponding to the pixel positions in which dots are newly added and arranged, according to the dot arrangements of the dot numbers obtained in the dot array set creating step.

9. An image forming apparatus, comprising:

an image processing device which performs digital halftoning using the threshold matrix created by the threshold matrix creating method as defined in claim 8;

a recording head which has an image recording element row in which are arrayed a plurality of image recording elements that are driven according to dot data generated by the image processing device; and a conveyance device which moves the recording head and a recording medium relatively to each other by conveying at least one of the recording head and the recording medium.

10. A non-transitory computer readable information storage medium having embodied thereon a dot arrangement determination program for performing, by a computer, determination of an arrangement pattern to create a pseudo gradation image when m dots (where m is a natural number) corresponding to a plurality of recording elements are arranged in a specific pixel area in the pseudo gradation image, the dot arrangement determination program comprising:

a first code segment for a setting step of variably setting an arrangement pattern in which the m dots are arranged without overlapping at pixel positions in the specific pixel area;

a second code segment for a first image evaluation value calculating step of calculating an image evaluation value of a halftone image formed by arranging the m dots in the specific pixel area in accordance with the arrangement pattern set in the setting step in a case assumed that there is no inability to form the m dots;

a third code segment for a second image evaluation value calculating step of calculating an image evaluation value of a halftone image implemented according to the arrangement pattern set in the setting step in a case assumed that there is inability to form dots in an arbitrary pixel row in the specific pixel area without determining which recording element is defective; and a fourth code segment for a dot arrangement calculating step of determining the arrangement pattern with least image quality degradation for the inability to form the dots in the arbitrary pixel row in the specific pixel area by solving a combinational optimization problem by using an approximate solution method for the arrangement pattern using calculation results of the first and second image evaluation value calculating steps.

11. The medium as defined in claim 10, wherein the dot arrangement determination program further comprises:

a fifth code segment for, when a dot arrangement with a larger dot number than an already determined dot arrangement is to be determined, determining an arrangement pattern in which dots equal to a number of additional dots are newly arranged in pixel positions where no dots are arranged in the already determined dot arrangement while the already determined dot arrangement is maintained; and a sixth code segment for, when a dot arrangement with a smaller dot number than the already determined dot arrangement is to be determined, determining an arrangement pattern in which dots equal to a dot number equivalent to a difference between the dot number of the already determined dot arrangement and a dot number to be next determined are subtracted from the already determined dot arrangement.

12. A computer readable information storage medium having embodied thereon a threshold matrix creating program for performing, by a computer, creation of a threshold matrix, the threshold matrix creating program comprising:

a first code segment for a dot array set creating step of determining dot arrangements for all dot numbers from a smallest dot number to a largest dot number using the dot arrangement determination program embodied on the medium defined in claim 11, and creating a dot array set having the dot arrangements for these dot numbers as elements;

a second code segment for a threshold matrix creating step of creating a threshold matrix by sequentially assigning thresholds to the pixel positions in a matrix corresponding to the pixel positions in which dots are newly added and arranged, according to the dot arrangements of the dot numbers obtained in the dot array set creating step.

13. A dot arrangement determination apparatus which performs calculations for determining an arrangement pattern to create a pseudo gradation image when m dots (where m is a natural number) corresponding to a plurality of recording elements are arranged in a specific pixel area in the pseudo gradation image, the apparatus comprising:

a setting device which variably sets an arrangement pattern in which the m dots are arranged without overlapping at pixel positions in the specific pixel area;

a first image evaluation value calculating device which calculates an image evaluation value of a halftone image formed by arranging the m dots in the specific pixel area in accordance with the arrangement pattern set by the setting device in a case assumed that there is no inability to form the m dots;

a second image evaluation value calculating device which calculates an image evaluation value of a halftone image implemented according to the arrangement pattern set by the setting device in a case assumed that there is inability to form dots in an arbitrary pixel row in the specific pixel area without determining which recording element is defective; and a dot arrangement calculating device which determines the arrangement pattern with least image quality degradation for the inability to form the dots in the arbitrary pixel row in the specific pixel area by solving a combinational optimization problem by using an approximate solution method for the arrangement pattern using results calculated by the first and second image evaluation value calculating devices.

14. The dot arrangement determination apparatus as defined in claim 13, wherein the dot arrangement calculating device uses simulated annealing as an optimization technique for solving the combinational optimization problem by using the approximate solution method.

15. The dot arrangement determination apparatus as defined in claim 13, wherein the image evaluation value includes a value for evaluating at least one of graininess and anisotropy.

16. The dot arrangement determination apparatus as defined in claim 15, wherein the image evaluation value is calculated using a dot evaluation function comprising a linear combination of a graininess evaluation function and an anisotropy evaluation function.

17. The dot arrangement determination apparatus as defined in claim 13, wherein the dot arrangement calculating device includes a fluctuation evaluation value calculating device which calculates a fluctuation evaluation value that indicates fluctuation in the image evaluation value resulting from the inability to form the dots, based on calculation results of the first and second image evaluation value calculating devices.

18. The dot arrangement determination apparatus as defined in claim 17, wherein the dot arrangement calculating device further includes an evaluation value calculating device which calculates an evaluation value comprising a linear combination of the image evaluation value obtained by the first image evaluation value calculating device and the fluctuation evaluation value obtained by the fluctuation evaluation value calculating device.

19. The dot arrangement determination apparatus as defined in claim 13, wherein:
   when a dot arrangement with a larger dot number than an already determined dot arrangement is to be determined, the dot arrangement calculating device determines an arrangement pattern in which dots equal to a number of additional dots are newly arranged in pixel positions where no dots are arranged in the already determined dot arrangement while the already determined dot arrangement is maintained; and
   when a dot arrangement with a smaller dot number than the already determined dot arrangement is to be determined, the dot arrangement calculating device determines an arrangement pattern in which dots equal to a dot number equivalent to a difference between the dot number of the already determined dot arrangement and a dot number to be next determined are subtracted from the already determined dot arrangement.

20. A threshold matrix creating apparatus, comprising:
   a dot array set creating device which determines dot arrangements for all dot numbers from a smallest dot number to a largest dot number using the dot arrangement determination apparatus as defined in claim 19, and creates a dot array set having the dot arrangements for these dot numbers as elements; and
   a threshold matrix creating device which creates a threshold matrix by sequentially assigning thresholds to the pixel positions in a matrix corresponding to the pixel positions in which dots are newly added and arranged, according to the dot arrangements of the dot numbers obtained by the dot array set creating device.

21. The dot arrangement determination apparatus as defined in claim 13,
   wherein the first image evaluation value calculating device calculates the image evaluation value including a value for evaluating at least one of graininess and anisotropy of the halftone image formed by arranging the m dots in the specific pixel area in accordance with the arrangement pattern set by the setting device in the case assumed that there is no inability to form the m dots,
   wherein the dot arrangement calculating device includes:
   a fluctuation evaluation value calculating device which calculates a fluctuation evaluation value that indicates fluctuation in the image evaluation value resulting from the inability to form the dots, based on calculation results of the first and second image evaluation value calculating devices; and
   a compound evaluation value calculating device which calculates a compound evaluation value composed of the image evaluation value obtained by the first image evaluation value calculating device and the fluctuation evaluation value obtained by the fluctuation evaluation value calculating device,
   wherein the dot arrangement calculating device solves the combinational optimization problem of choosing an optimum arrangement pattern from a plurality of arrangement patterns in each of which the m dots are arranged without overlapping at pixel positions in the specific pixel area, by using the approximate solution method while evaluating image quality of each of the plurality of arrangement patterns set by the setting device and evaluating the image quality degradation for the inability to form the dots according to the compound evaluation value obtained by the compound evaluation value calculating device, so as to determine the arrangement pattern producing the most favorable compound evaluation value.

22. The dot arrangement determination method as defined in claim 1,
   wherein in the first image evaluation value calculating step, the image evaluation value including a value for evaluating at least one of graininess and anisotropy of the halftone image formed by arranging the m dots in the specific pixel area in accordance with the arrangement pattern set in the setting step in the case assumed that there is no inability to form the m dots is calculated,
   wherein the dot arrangement calculating step includes:
   a fluctuation evaluation value calculating step of calculating a fluctuation evaluation value that indicates fluctuation in the image evaluation value resulting from the inability to form the dots, based on calculation results of the first and second image evaluation value calculating steps; and
   a compound evaluation value calculating step of calculating a compound evaluation value composed of the image evaluation value obtained in the first image evaluation value calculating step and the fluctuation evaluation value obtained in the fluctuation evaluation value calculating step,
   wherein in the dot arrangement calculating step, the combinational optimization problem of choosing an optimum arrangement pattern from a plurality of arrangement patterns in each of which the m dots are arranged without overlapping at pixel positions in the specific pixel area is solved by using the approximate solution method while evaluating image quality of each of the plurality of arrangement patterns set in the setting step and evaluating the image quality degradation for the inability to form the dots according to the compound evaluation value obtained in the compound evaluation value calculating step, for determining the arrangement pattern producing the most favorable compound evaluation value.

* * * * *